US007475072B1

(12) United States Patent
Ershov

(10) Patent No.: US 7,475,072 B1
(45) Date of Patent: Jan. 6, 2009

(54) CONTEXT-BASED SEARCH VISUALIZATION AND CONTEXT MANAGEMENT USING NEURAL NETWORKS

(75) Inventor: Alexander V. Ershov, Sergiev Posad (RU)

(73) Assignee: Quintura, Inc., Alexandria, VA (US)

( * ) Notice: Subject to any disclaimer, the term of this patent is extended or adjusted under 35 U.S.C. 154(b) by 196 days.

(21) Appl. No.: 11/468,692

(22) Filed: Aug. 30, 2006

Related U.S. Application Data

(60) Provisional application No. 60/735,858, filed on Nov. 14, 2005, provisional application No. 60/722,412, filed on Oct. 3, 2005, provisional application No. 60/719,975, filed on Sep. 26, 2005.

(51) Int. Cl.
G06F 17/30 (2006.01)
G06F 15/16 (2006.01)
(52) U.S. Cl. .................... 707/6; 707/3; 707/5
(58) Field of Classification Search .............. 707/6
See application file for complete search history.

(56) References Cited

U.S. PATENT DOCUMENTS

| 5,963,965 | A | * | 10/1999 | Vogel | 715/236 |
| 5,966,126 | A | * | 10/1999 | Szabo | 715/762 |
| 6,167,398 | A | * | 12/2000 | Wyard et al. | 707/5 |
| 6,938,034 | B1 | * | 8/2005 | Kraft et al. | 707/3 |
| 7,181,438 | B1 | * | 2/2007 | Szabo | 707/2 |
| 2003/0069873 | A1 | * | 4/2003 | Fox et al. | 707/1 |
| 2003/0212663 | A1 | * | 11/2003 | Leno et al. | 707/3 |
| 2004/0083206 | A1 | * | 4/2004 | Wu et al. | 707/3 |
| 2004/0181547 | A1 | * | 9/2004 | Mazzagatti | 707/104.1 |
| 2005/0086186 | A1 | * | 4/2005 | Sullivan et al. | 706/16 |
| 2005/0144158 | A1 | * | 6/2005 | Capper et al. | 707/3 |
| 2006/0200461 | A1 | * | 9/2006 | Lucas et al. | 707/5 |
| 2006/0287985 | A1 | * | 12/2006 | Castro et al. | 707/3 |

OTHER PUBLICATIONS

Dursteler, Juan C., InfoVis, http://www.infovis.net/printMag.php?num=97&lang=2, KartOO, Aug. 19,2002.*

* cited by examiner

Primary Examiner—Tony Mahmoudi
Assistant Examiner—Brittany N McCue
(74) Attorney, Agent, or Firm—Bardmesser Law Group

(57) ABSTRACT

A system, method and computer program product for visualization of context-based search results, including a plurality of neurons, the neurons being associated with words and documents; a plurality of connections between the neurons; a map that displays at least some of the neurons to a user, wherein the display of the neurons on the map corresponds to their relevance to a search query; a display of the links to the relevant documents; and means for changing positions of the neurons relative to each other based on input from the user. Changing a position of one neuron relative to other neurons also changes positions of other contextually relevant neurons, and displays different relevant documents. The map displays the neurons with their relevance identified by any of font type, color, transparency and font size. The map includes icons in proximity to the displayed word neurons for identifying those neurons as irrelevant. Links to the documents are obtained from a search engine having an input query. The map displays annotations and/or keywords to the documents next to the displayed documents.

30 Claims, 38 Drawing Sheets

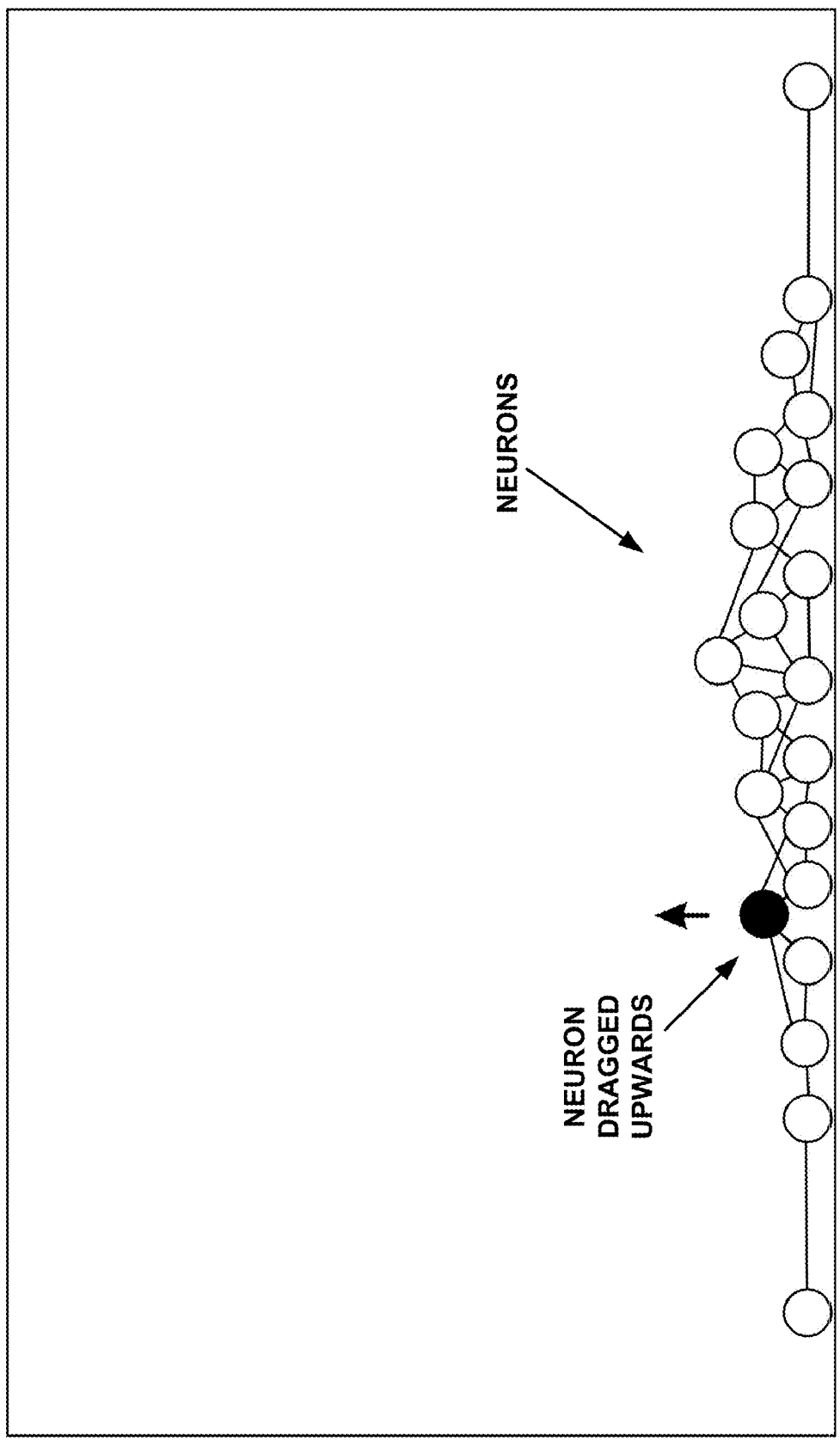

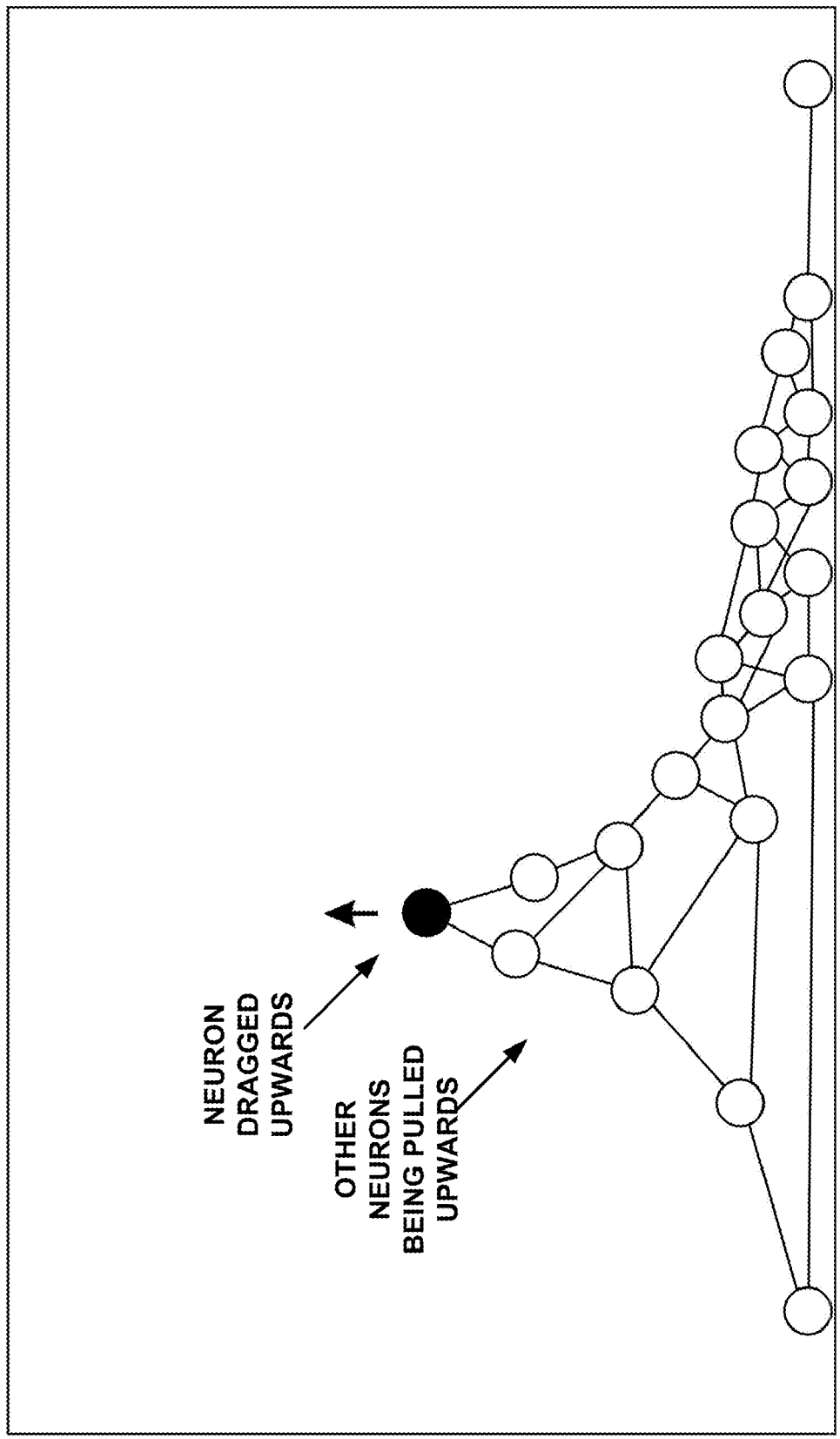

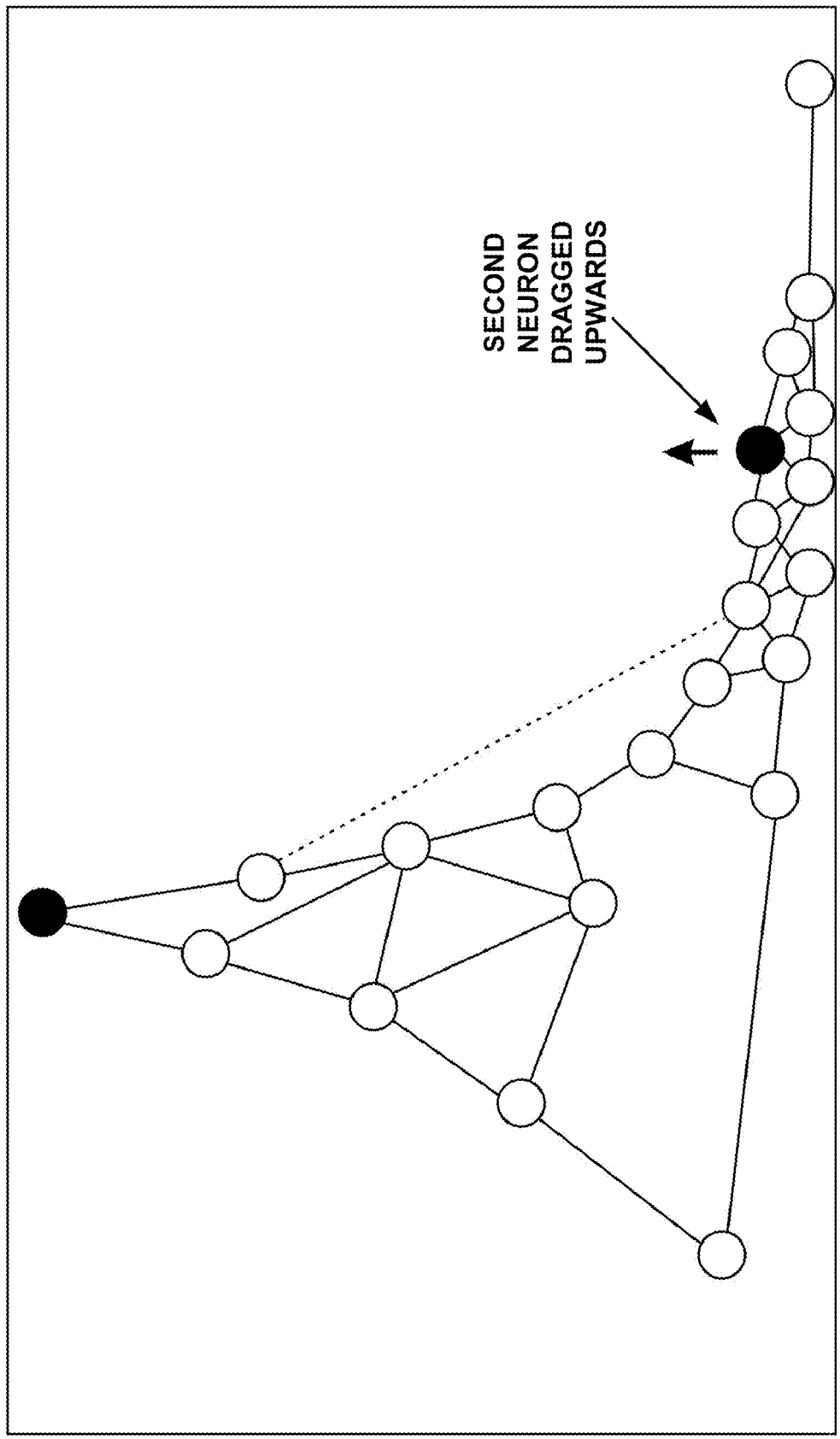

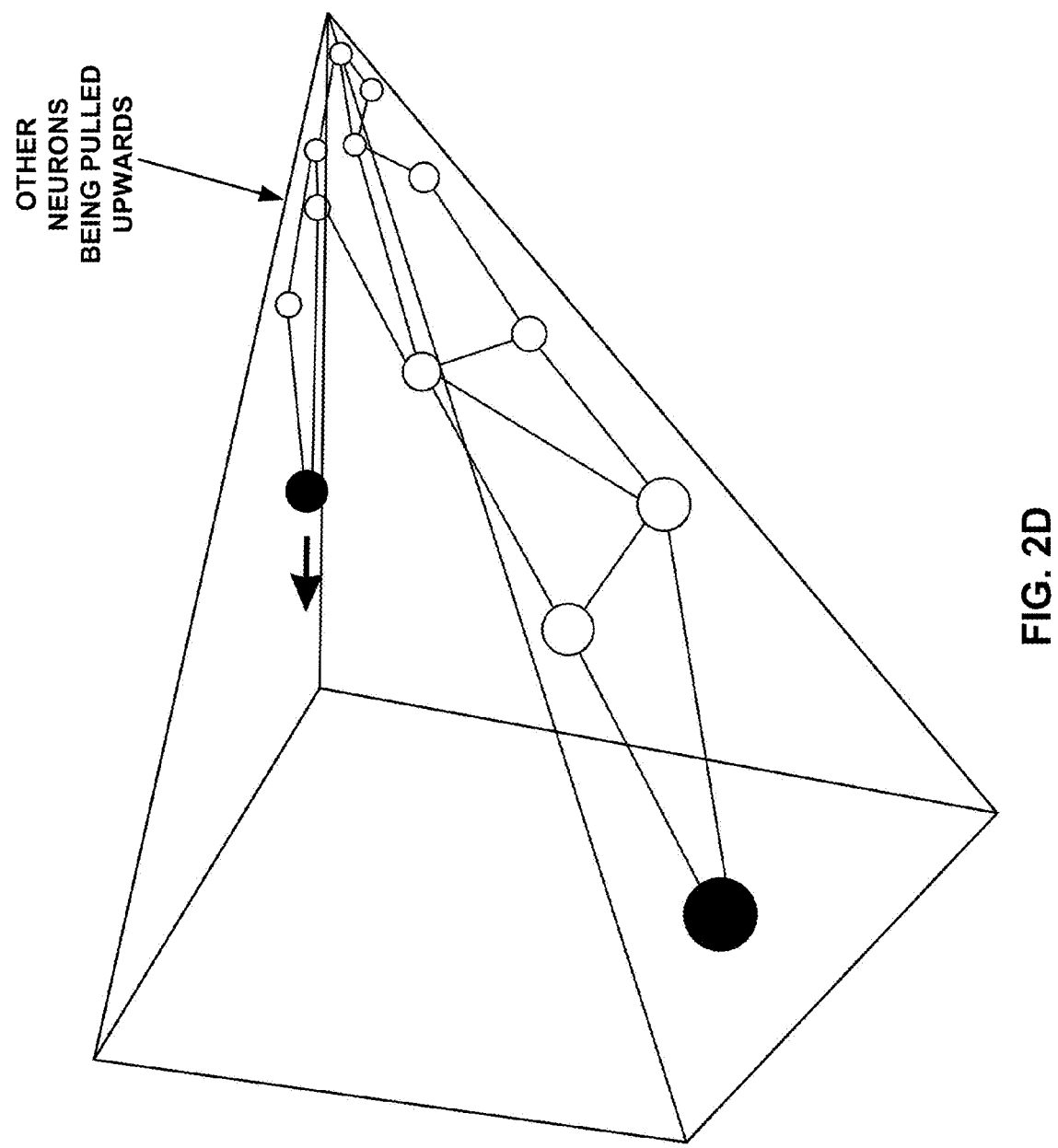

CONTEXT-BASED SEARCH VISUALIZATION AND CONTEXT MANAGEMENT USING NEURAL NETWORKS

CROSS-REFERENCE TO RELATED APPLICATIONS

This application is a non-provisional of U.S. Provisional Patent Application No. 60/719,975, filed on Sep. 26, 2005, entitled CONTEXT-BASED SEARCH VISUALIZATION USING NEURAL NETWORKS, and is a non-provisional of U.S. Provisional Patent Application No. 60/735, 858, filed on Nov. 14, 2005, entitled ONE-CLICK SEARCHING SYSTEM AND METHOD, and is a non-provisional of U.S. Provisional Patent Application No. 60/722,412, entitled USE OF NEURAL NETWORKS FOR KEYWORD GENERATION, filed on Oct. 3, 2005, which are incorporated by reference herein in their entirety.

BACKGROUND OF THE INVENTION

1. Field of the Invention

The present invention relates to techniques for visualization of search engine output as a means for assisting the user in selecting relevant search results.

2. Description of the Related Art

The World Wide Web ("web") contains a vast amount of information. Locating a desired portion of the information, however, can be challenging. This problem is compounded because the amount of information on the web and the number of new users inexperienced at web searching are growing rapidly.

Search engines attempt to return hyperlinks that point to web pages in which a user is interested. Generally, search engines base their determination of the user's interest on search terms (called a "search query") entered by the user. The goal of the search engine is to provide links to high quality, relevant results to the user based on the search query. Typically, the conventional search engine accomplishes this by matching the terms in the search query to a body of pre-stored web pages. Web pages that contain the user's search terms are "hits" and are returned to the user.

In an attempt to increase the relevancy and quality of the web pages returned to the user, a search engine may attempt to sort the list of hits so that the most relevant and/or highest-quality pages are at the top of the list of hits returned to the user. For example, the search engine may assign a rank or score to each hit, where the score is designed to correspond to the relevance or importance of the web page. Determining appropriate scores can be a difficult task. For one thing, the importance of a web page to the user is inherently subjective and depends on the user's interests, knowledge, and attitudes. Conventional methods of determining relevance are based on the contents of the web page. More advanced techniques determine the importance of a web page based on more than the content of the web page, such as which pages link to it.

At present, a number of advanced system for information retrieval exist—vast sums of money are annually spend on search engine optimization, indexing more information content, document ranking, etc.

Unfortunately the rising amount of indexed databases entails one of the most common problems of standard search engines—the problem of giving too many results for a simple (from a user's point of view) query. The page ranking system tends to show the documents most frequently used in relation to the keywords, which often complicates a user's task to find a "non-typical" context of the query—the so-called "tyranny of the majority" problem. As a result, the user cannot find the required document in the first 10 to 30 results and has no simple way to specify the query. Frequently, the sought document is the $50^{th}$, or the $250^{th}$, in the search result list. Although conventional search engines continually improve the quality of annotations, the problem still exists—the user needs to think hard while reading the annotation to decide whether this document is what is sought.

To build complex queries, a query language can be used. Almost every search engine uses such a language, and with the help of logical (Boolean) operations, a user can point out the words that are to be in the required document, show how far apart they can be from each other, enumerate synonyms, and identify possible unwanted words in the required document. Unfortunately that language requires special knowledge, a change in the usual approach of most lay users, which makes the language practically inaccessible for most users, and therefore all search engines use an extra page, hidden on the main search page.

Conventional search engines also use the standard concept of a command line to type in a query. One has to type a large number of symbols that can result in a typo building the wrong query due to the wrong spelling of the required word.

The overriding goal of a search engine is to return the most desirable set of links for any particular search query. Accordingly, there is a need in the art for an effective and efficient system and method for visualizing search results as an aid to context-based searching.

Furthermore, many search concepts are not easily expressible in terms of simple Boolean operations, such as AND, OR, AND NOT, etc., but instead correspond to degrees of AND, degrees of NOT, etc. Accordingly, there is a particular need for managing searches in cases where the concepts being searched for are not easily represented by simple Boolean operators.

SUMMARY OF THE INVENTION

Accordingly, the present invention is related to context-based search visualization and search result management using neural networks that substantially obviates one or more of the disadvantages of the related art.

In one aspect, there is provided a system, method and computer program product for visualization of context-based search results that includes a plurality of neurons associated with words and documents, and optionally with objects, sentences and paragraphs. A plurality of connections connect the neurons. A means for displaying the neurons to a user, and a means for changing positions of the neurons relative to each other based on input from the user can be present. Changing a position of one neuron relative to other neurons also changes positions of other contextually relevant neurons, permitting the user to identify relevant documents.

The input from the user can be dragging a neuron on a display device, or, e.g., changing a weight coefficient of a connection between two neurons to indicate relevance.

The neurons can be displayed in a form of a two-dimensional "mountain peak" diagram, with the most relevant neurons located at the top of the diagram; or positioned within a pyramid, with the most relevant neurons located at the base of the pyramid, and the most irrelevant neurons located at the point of the pyramid; or positioned within a "map" based on a sphere, with the most relevant neurons located on a surface of the sphere, and the most irrelevant neurons located at the center of the sphere; or positioned within a cube, with the most relevant neurons located on a surface of the cube, and the most irrelevant neurons located at the center of the cube; or positioned within a polyhedron, with the most relevant neurons located on a surface of the polyhedron, and the most irrelevant neurons located at the center of the polyhedron; or positioned within a polyhedron, with the most irrelevant neurons located on a surface of the polyhedron, and the most relevant neurons located at the center of the polyhedron.

In another aspect, a system, method and computer program product for visualization of context-based search results includes a plurality of neurons, the neurons being associated with words and documents; a plurality of connections between the neurons; a map that displays at least some of the neurons to a user, wherein the display of the neurons on the map corresponds to their relevance to a search query; a display of the links to the relevant documents; and means for changing positions of the neurons relative to each other based on input from the user. Changing a position of one neuron relative to other neurons also changes positions of other contextually relevant neurons, and displays different relevant documents. The map includes icons in proximity to the displayed word neurons for identifying those neurons as irrelevant. Links to the documents are obtained from a search engine having an input query. The map displays annotations to the documents next to the displayed documents.

Relevance can be further indicated by any of font size, text transparency, font color, and animation effects associated with text of at least some of the neurons. At least some of the neurons that correspond to objects can have icons associated with them, the icons corresponding to a meaning of the objects.

Additional features and advantages of the invention will be set forth in the description that follows, and in part will be apparent from the description, or may be learned by practice of the invention. The advantages of the invention will be realized and attained by the structure particularly pointed out in the written description and claims hereof as well as the appended drawings.

It is to be understood that both the foregoing general description and the following detailed description are exemplary and explanatory and are intended to provide further explanation of the invention as claimed.

BRIEF DESCRIPTION OF THE ATTACHED FIGURES

The accompanying drawings, which are included to provide a further understanding of the invention and are incorporated in and constitute a part of this specification, illustrate embodiments of the invention and together with the description serve to explain the principles of the invention.

In the drawings:

FIGS. 1A-1F illustrate a two-dimensional interpretation of the ball of rubber bands as used for visualization.

FIGS. 2A-2F can be viewed as a pyramid visualization analog of the two-dimensional construct of FIGS. 1A-1F.

FIGS. 6-17 illustrate how the visualization techniques illustrated in FIGS. 1A-4H can be applied to implement "one click searching."

DETAILED DESCRIPTION OF THE PREFERRED EMBODIMENTS

Figure 1D:
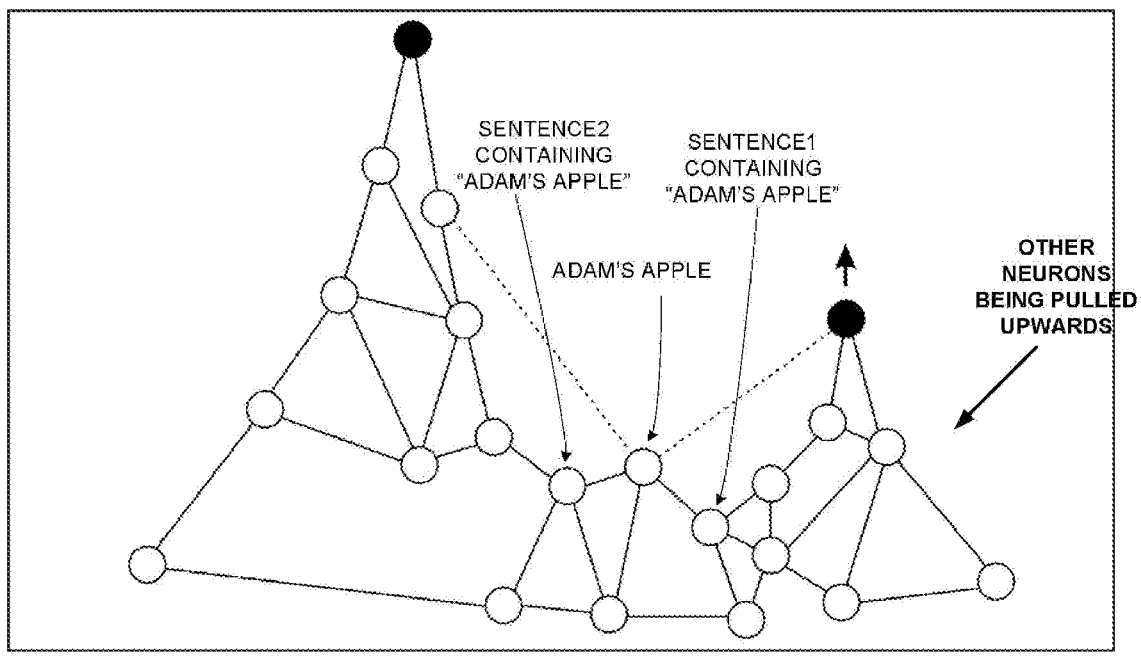

Reference will now be made in detail to the embodiments of the present invention, examples of which are illustrated in the accompanying drawings.

The problem of context-based searching and the problem of visualization of search results are closely related to each other. As is well known, most conventional search engines provide a user with a list of excerpts (annotations) from documents in which the search terms have been found. For example, search engines available from Google, Yahoo!, or Microsoft take, as their input, a query consisting of search terms, and provide, as their output, a set of web pages that the user can view in his browser. Each of the web search result pages has a number of links to the documents, together with some annotations of the documents. There are, however, a number of problems with this approach.

One problem is the need for the user to read a significant amount of text before reaching the "right" document. Using the word "apple" as an example, inputting the word "apple" as a search term into Google results in a large number of hits that relate to Apple Computer, a smaller number of hits that relate to apple the fruit, and some number of hits that relates to Adam's apple. If the user is interested in documents that relate to apple the fruit, then, in order to bring the relevant results closer to the top of the relevance ranking, he needs to add the word "fruit" to his search.

However, there are many documents on the Internet that relate to apples, but do not themselves mention the word "fruit." One way to eliminate irrelevant documents is through Boolean searching, in this case, for example, by constructing a query along the lines of "apple AND NOT computer." This will eliminate all the documents that mention the word "apple" and the word "computer." However, not every document that deals with Apple Computer, Inc. necessarily mentions the word "computer." Furthermore, there can be documents about apple the fruit, but which also mention the word "computer" (e.g., relating to the use of computers by apple growers for quality control), and which are therefore also excluded.

Therefore, what is needed is a way for the user to be able to do text searches that are context-based, and that provide an easy to use interface, including visualization, to able to tune the context appropriately.

To better understand the present approach to context-based searching and visualization, it is useful to review the concept of neural networks as described in co-pending application No. 60/719,976, filed on Sep. 26, 2005, entitled NEURAL NETWORKS FOR ELECTRONIC SEARCH APPLICATONS, incorporated herein by reference. A neutral network is generally described by two entities—the basic element of the network, generally called a neuron, and the architecture, or topology, of the network. A neural network as described in application No. 60/719,976 can be conceptually viewed as being structured into several layers. The first layer consists of neurons that represent all the words that occur in all the documents that have been indexed by a search engine. As the number of indexed documents increases, essentially, the lower layer will represent most, if not every, word that exists in the English language. If foreign language documents are also indexed, then every word in the foreign languages will eventually be included in the index of words as well.

The neurons are connected to each other through a set of connections, although most neurons are connected to only a finite set of other neurons, typically a number significantly less than the total number of "word" neurons in the first layer. For example, the words "apple," "computer," "hardware," "keyboard," "fruit," "joystick," "mouse," "Adam," "house," "granite" all have a neuron associated with them. The values of the coefficients (weights) of the connections between the words are also representative of how frequently the words occur in proximity to each other, or in the same document. Generally, this is determined based on indexing a relatively large number of documents.

Preferably, the connection coefficients, or weights, are normalized, such that words that occur very frequently next to each other (and, are presumably closely related to each other contextually), have a coefficient of up to +1, and words that never occur next to each other, or have no relationship to each other, have a coefficient of 0. For example, using the words above as an example, the neuron for "apple" and the neuron for "computer" has a connection weight that is close to +1. The user can specify, however, that he is specifically not interested in Adam's apple, which means specifying a connection weight of −1 between "Adam" and "apple" (this is analogous to a Boolean "NOT").

The word "apple" and the word "granite" (assuming that they virtually never occur next to each other or the same context) have a coefficient, or weight, of the connection between them of 0. As an alternative, to optimize performance, for neurons that have no logical connection between them (i.e., a weight of "0"), these connections can be omitted altogether, avoiding the need for additional processing.

The next layer, or second layer, is the object layer, which represents concepts associated with the words. The concepts can be words, or combinations of words. On this layer, the neuron corresponding to "apple" on layer 1 is connected to the neuron for object "computer," to the neuron for object "fruit," and to the neuron for object "Adam's apple." For many words associated with the neurons on layer one, there are several objects on layer 2 to which that neuron is connected.

The third layer is the sentence layer, where each neuron in layer 3 has a corresponding sentence associated with it. Typically, each sentence (neuron) has a connection to some neurons of layer 2, and to every neuron of layer 1 that corresponds to every word that occurs in that sentence (typically excluding words that carry no meaning, such as "the," "and," "to," "for," etc.).

The fourth layer is a document layer, where each neuron in layer 4 represents a document (or alternatively, to a link to that document, or some other pointer that points to the location of the document, or otherwise identifies the document). The neurons of layer 4 are connected to every neuron of layer 3 that represent the sentences in that document. They may also be connected to some neurons in layer 2, if it is known a priori that the document is related to the concept described by the neuron in layer 2, even if the word itself is not mentioned anywhere. For example, the word "joystick" may not be mentioned anywhere in a document that discusses playing games on Apple Computer, but nonetheless there would be a connection between the document and the word "joystick," since joysticks are related to playing games on Apple Computers. They may also be connected to other neurons of layer 4, if it is known that they discuss the same subject matter.

It should also be noted that the four-layer structure is somewhat arbitrary, and is primarily a mathematical visualization tool (not necessarily the way the neural network is actually implemented in computer code). For example, the second and third layers are optional, and furthermore, can be implemented in the same layer as layer one. Also, an additional layer with neurons corresponding to paragraphs may be added between the third layer and the fourth layer.

The neural network therefore can be conceptually visualized, as an initial matter, as a "ball of rubber bands," with the neurons attached to the ends of the rubber bands, and with each connection between the corresponding neurons being a rubber band of a certain tension, or strength. Depending on the strength of the connection between the two particular neurons, the rubber band connecting them can be stretched far (meaning, that the connection between the two words is weak or non-existent), or the rubber band can be compressed, so that the neurons are close to each other, and the coefficient of the corresponding connection is close to +1 corresponding to a strong relationship between the neurons.

FIGS. 1A-1F illustrate a two-dimensional interpretation of the ball of rubber bands. The neurons all initially "sink to the bottom," until one or more of them are pulled upwards (see FIGS. 1A-1B). The query by a user is the mechanism by which the user can, in effect, take one of the neurons, and pull it upwards. By pulling that neuron upwards, the neurons that have connections to it are also pulled upwards. This is shown in FIGS. 1C-1D, where two of the neurons have been pulled upwards, for example, one of them being an "apple" neuron, and another being a "computer" neuron (in response to a query "apple").

Figure 1E:
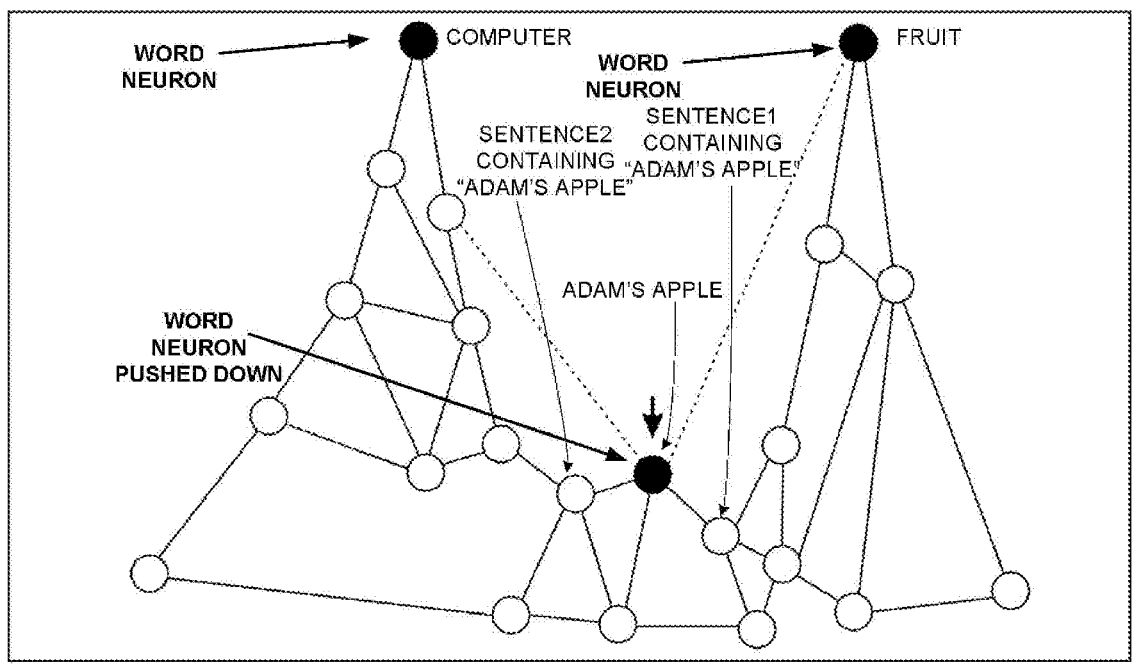
Figure 1F:
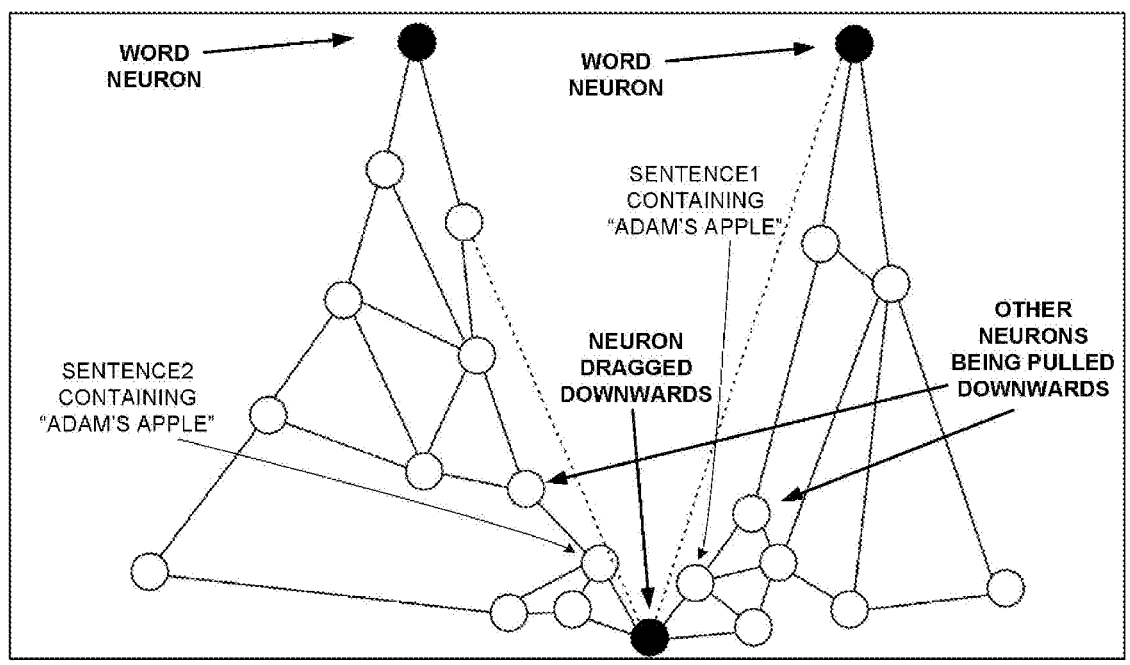
Figure 2A:
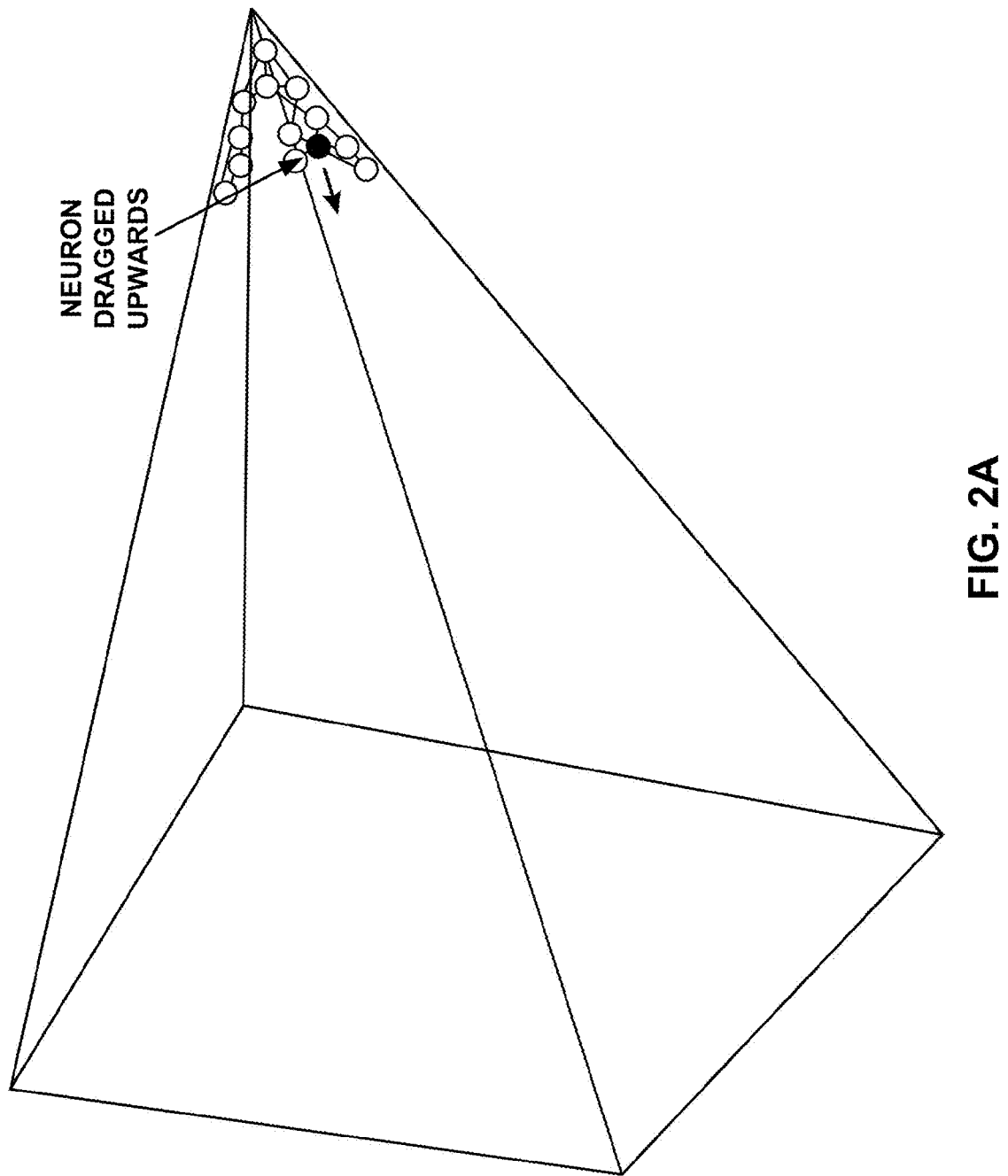
Figure 2B:
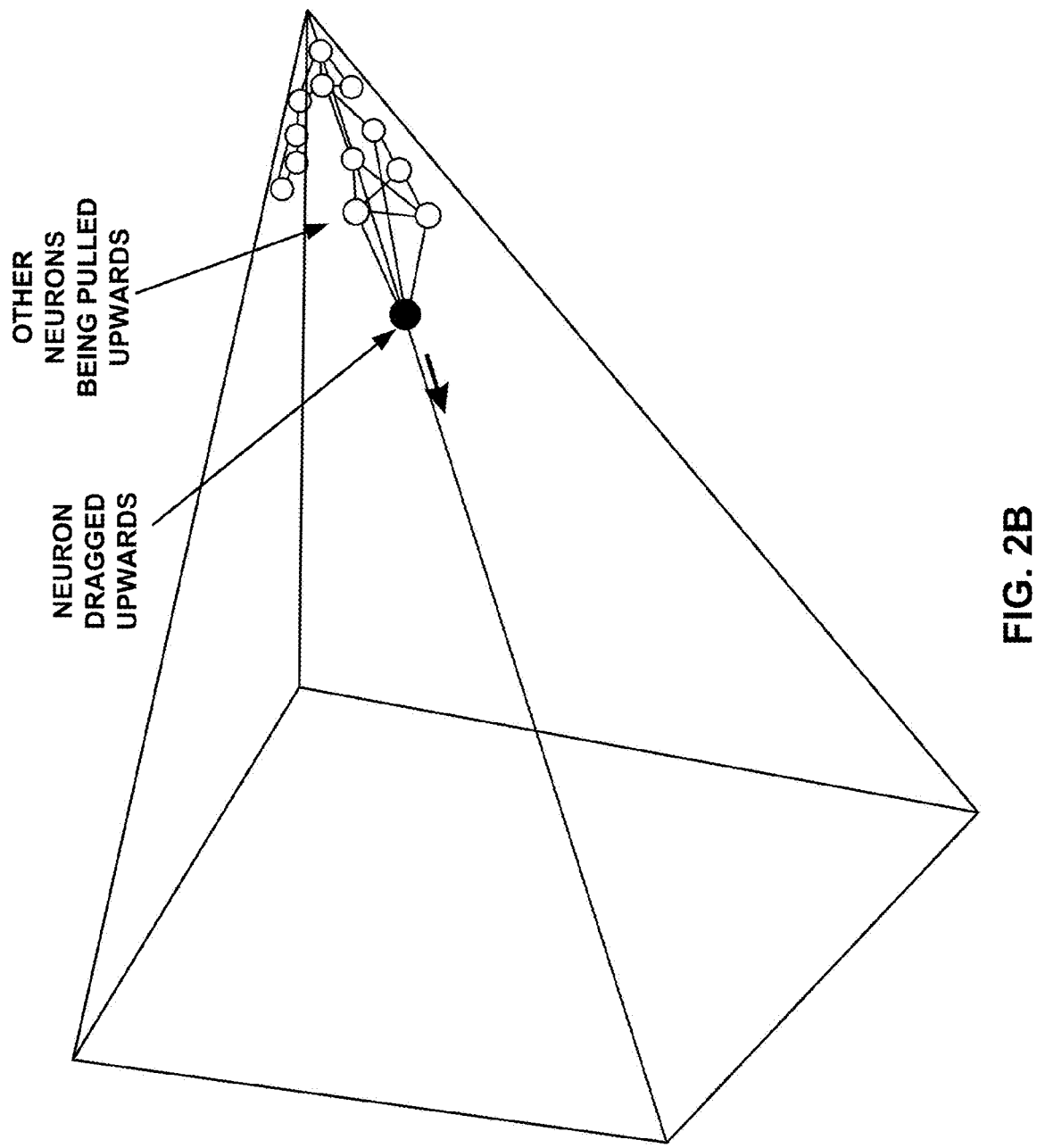
Figure 2C:
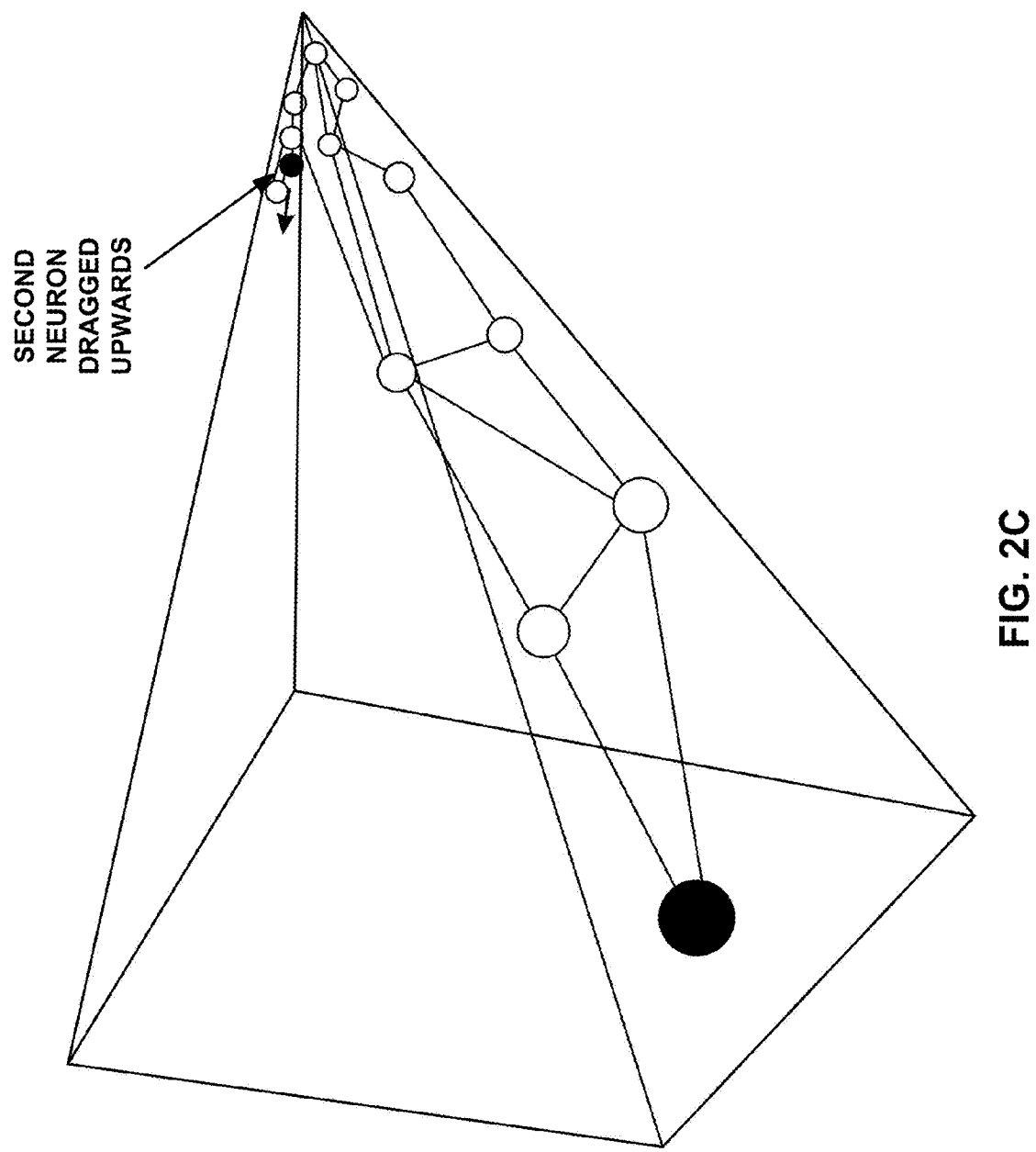
Figure 2E:
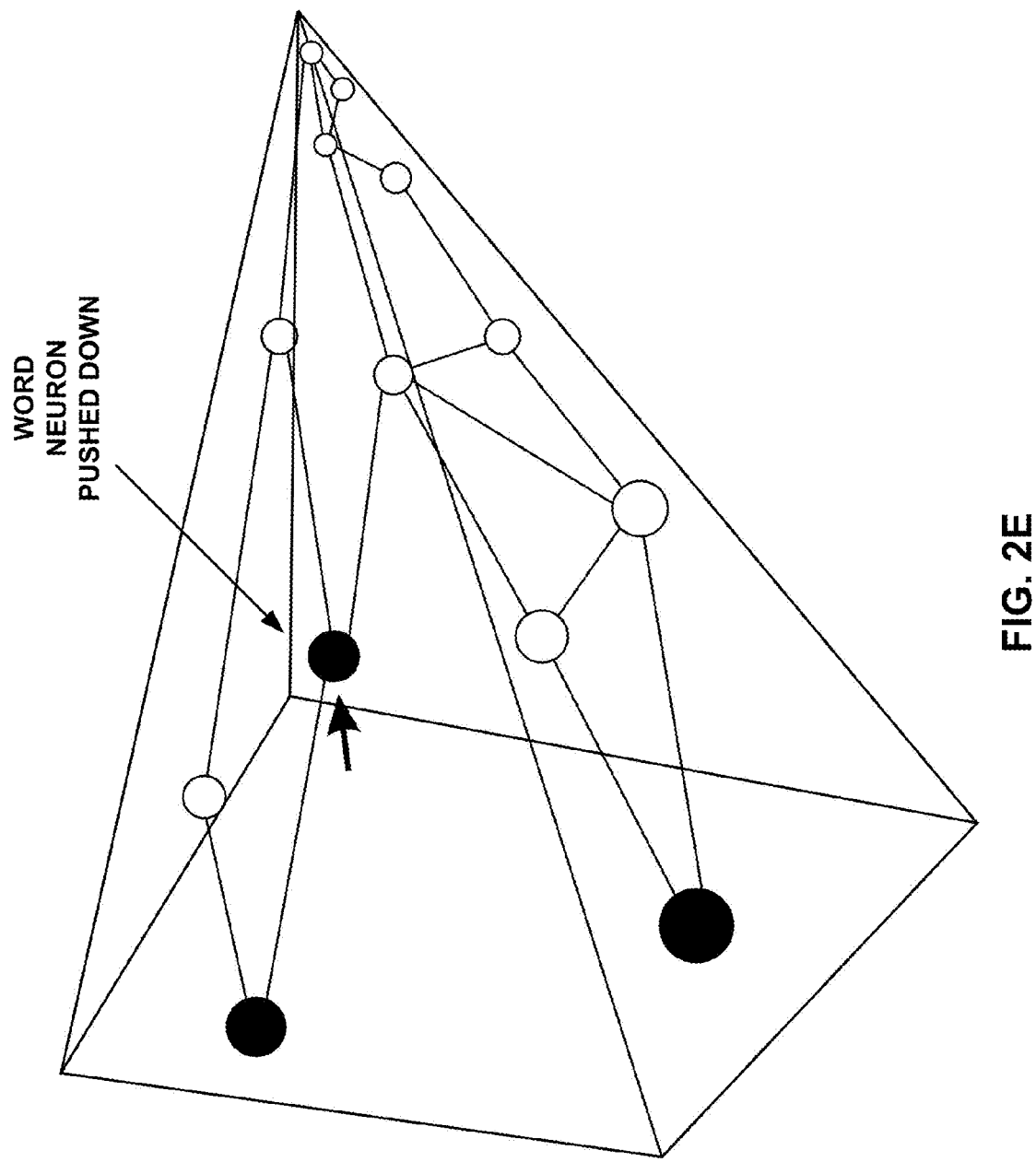
Figure 2F:
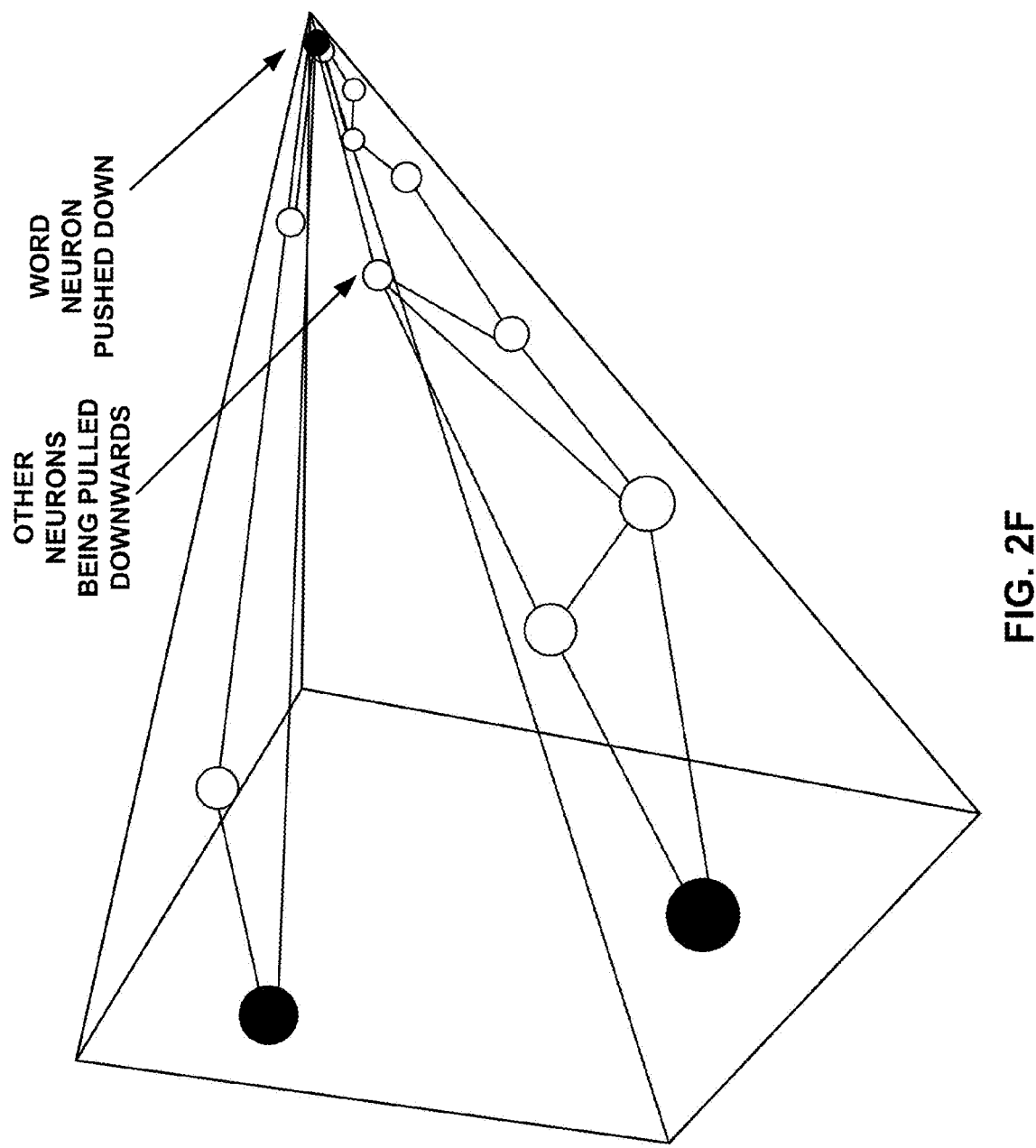

Also, note that the neurons that have been pulled upwards by the user may represent words, documents, objects, paragraphs, or sentences. Similarly, the neurons that have connections to the two neurons that the user pulls up (the blackened neurons in the figures) are also pulled upwards. On the other hand, if a neuron is pulled upwards that does not actually belong there (in other words, it is not relevant to the context of the query that the user has in mind), the user can "weigh that neuron down," or push it downwards. This is shown in FIGS. 1E-1F. The neurons that have connections to that neuron will also be pushed downwards. For example, if the concept "Adam's apple" is not relevant to the query, then that object (neuron) can be pushed all the way down to the bottom (see FIG. 1F, which may also be described as a "mountain peak" representation, with the peaks representing the most relevant neurons), and the associated neurons in other words, documents that discuss only Adam's apple, but not apple the fruit or Apple Computer, will be pushed down as well. By adjusting the context of the search in this manner, the user can readily zero in on only the documents that are relevant to the context of his search, and exclude from the search documents that are contextually irrelevant.

It will also be understood that what matters from the user's perspective is the relative movement of the neurons to each other (rather than movement of the neurons relative to some absolute level). In other words, it is possible to only drag relevant neurons upwards, only push relevant neurons downwards, or both.

The discussion with regard to FIGS. 1A-1F illustrates how the concept of search visualization can be applied to two-dimensional visualization. However, it is also applicable to any number of three-dimensional visualization approaches. For example, as shown in FIGS. 2A-2F, the two-dimensional "ball" of "rubber bands" can be made three-dimensional, and placed in a four-sided pyramid. Initially, the entire ball of rubber bands is at the bottom of the pyramid, which is shown inverted, with the point of the pyramid representing infinite distance, or "irrelevance." An initial query, for example, "apple," will start pulling up some of the neurons. As discussed previously, the user can pull certain neurons up (towards the base of the inverted pyramid), together with the neurons associated with it through their connections, and can push certain neurons down. Thus, FIGS. 2A-2F can be viewed as a pyramid visualization analog of the two-dimensional construct of FIGS. 1A-1F.

The most relevant neurons will eventually "float up" to the base of the inverted pyramid. The neurons that are ultimately of the most use to the user are those that represent documents that are the most contextually relevant. Thus, the base of the pyramid will ultimately be populated with links to the most relevant documents, while most of the rest of the neural network will be at infinity, i.e., at the point of the pyramid.

Figure 3A:
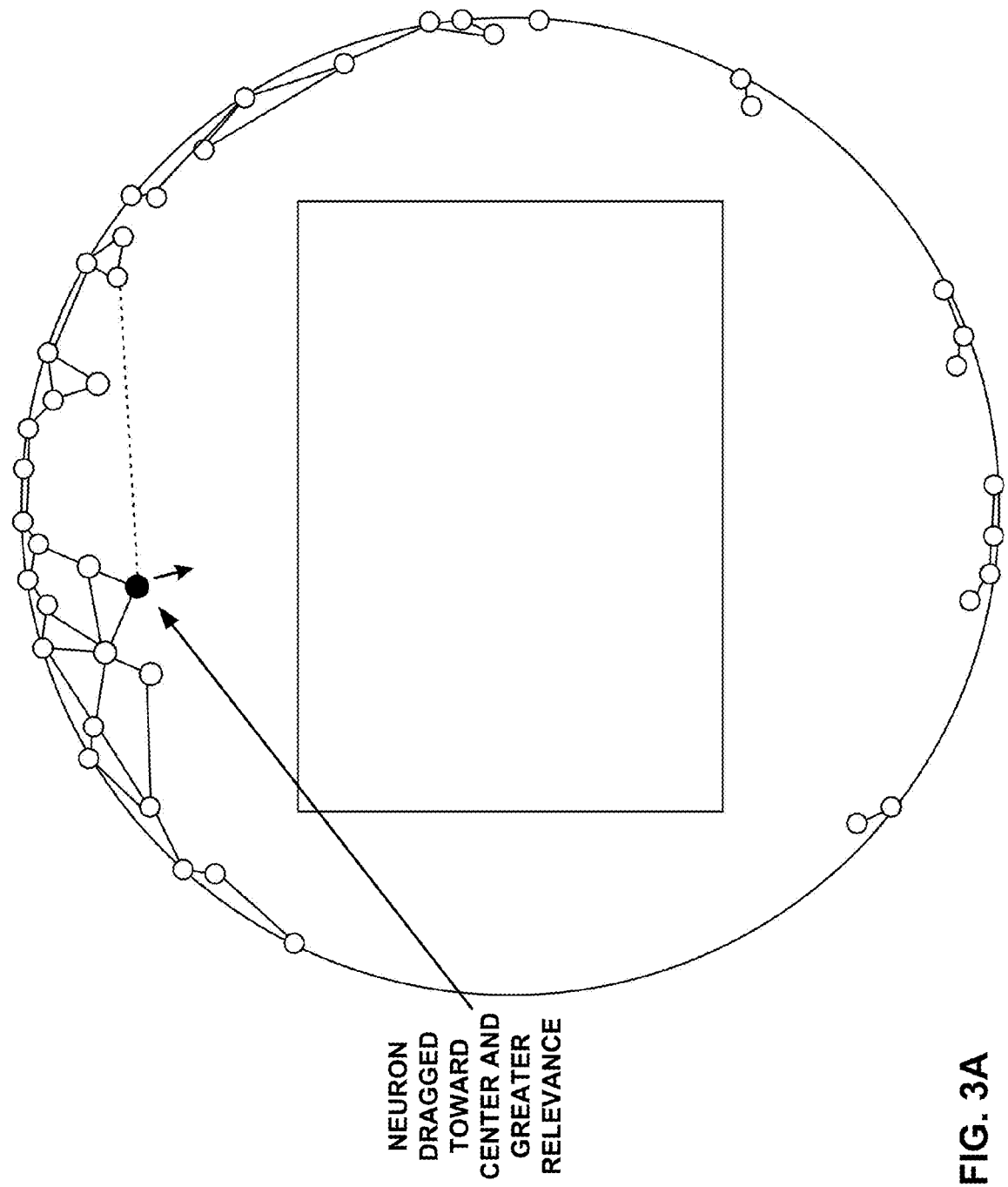
FIGS. 3A-3E represent a two-dimensional circular visualization construct.
Figure 3B:
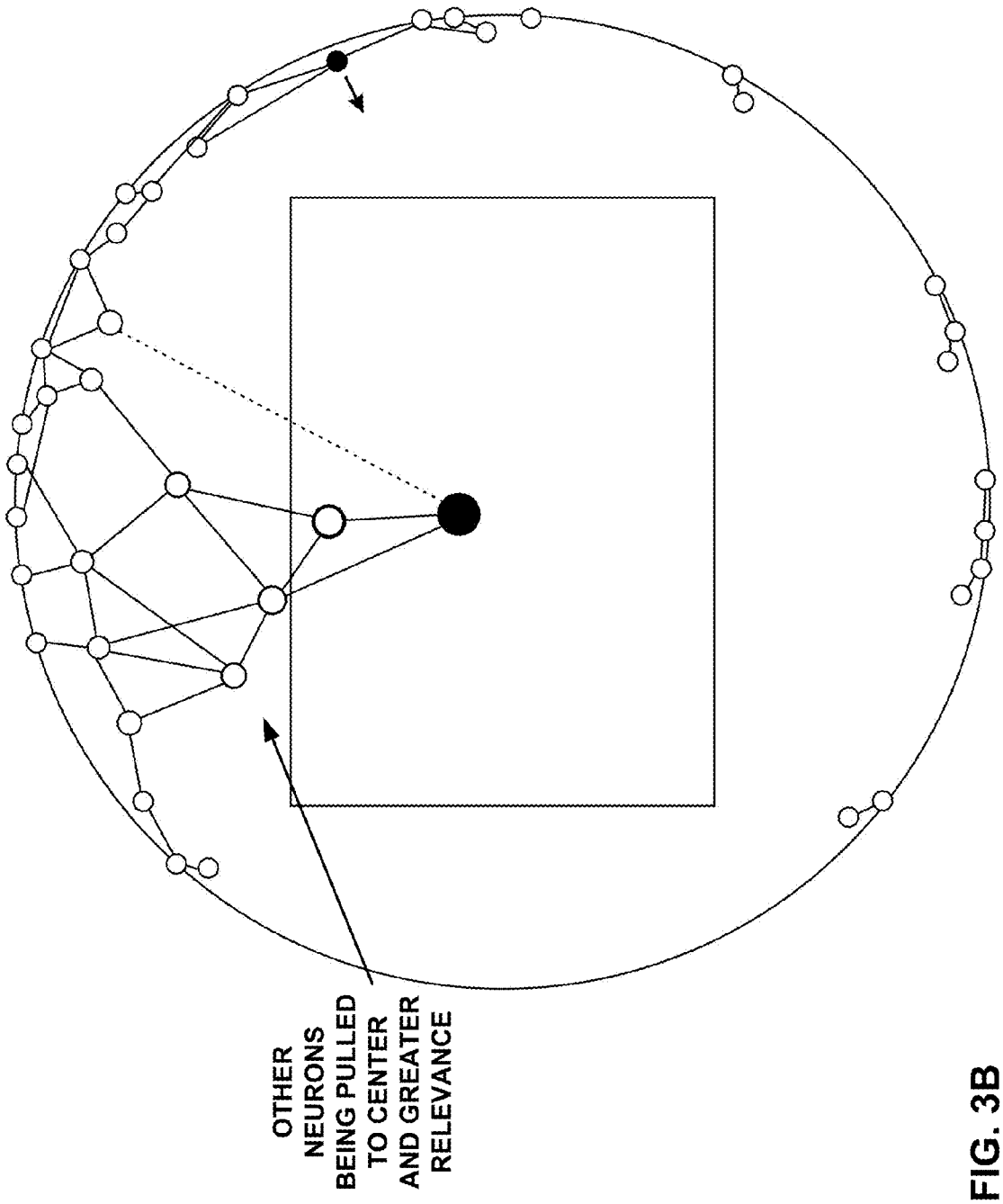
Figure 3C:
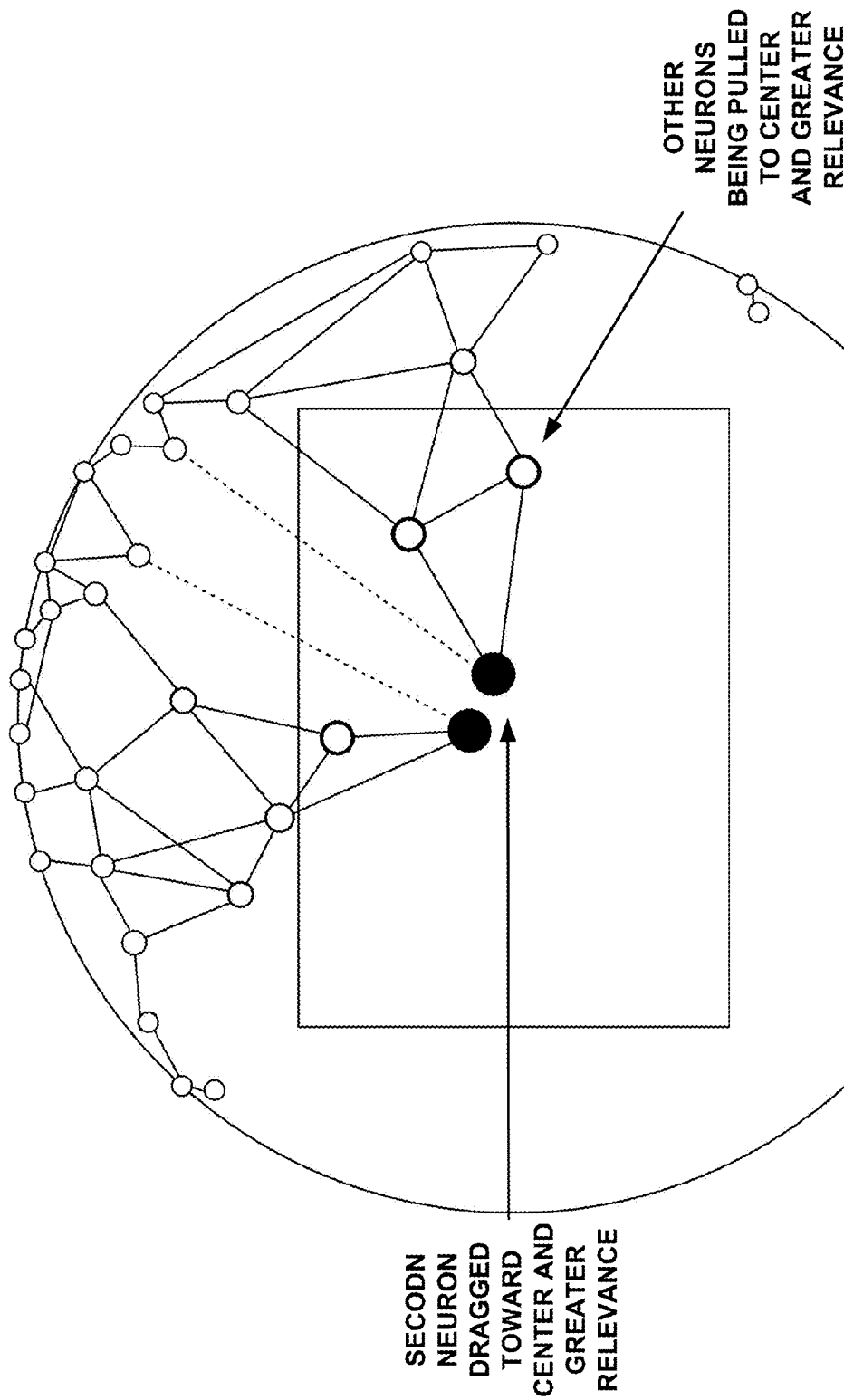
Figure 3D:
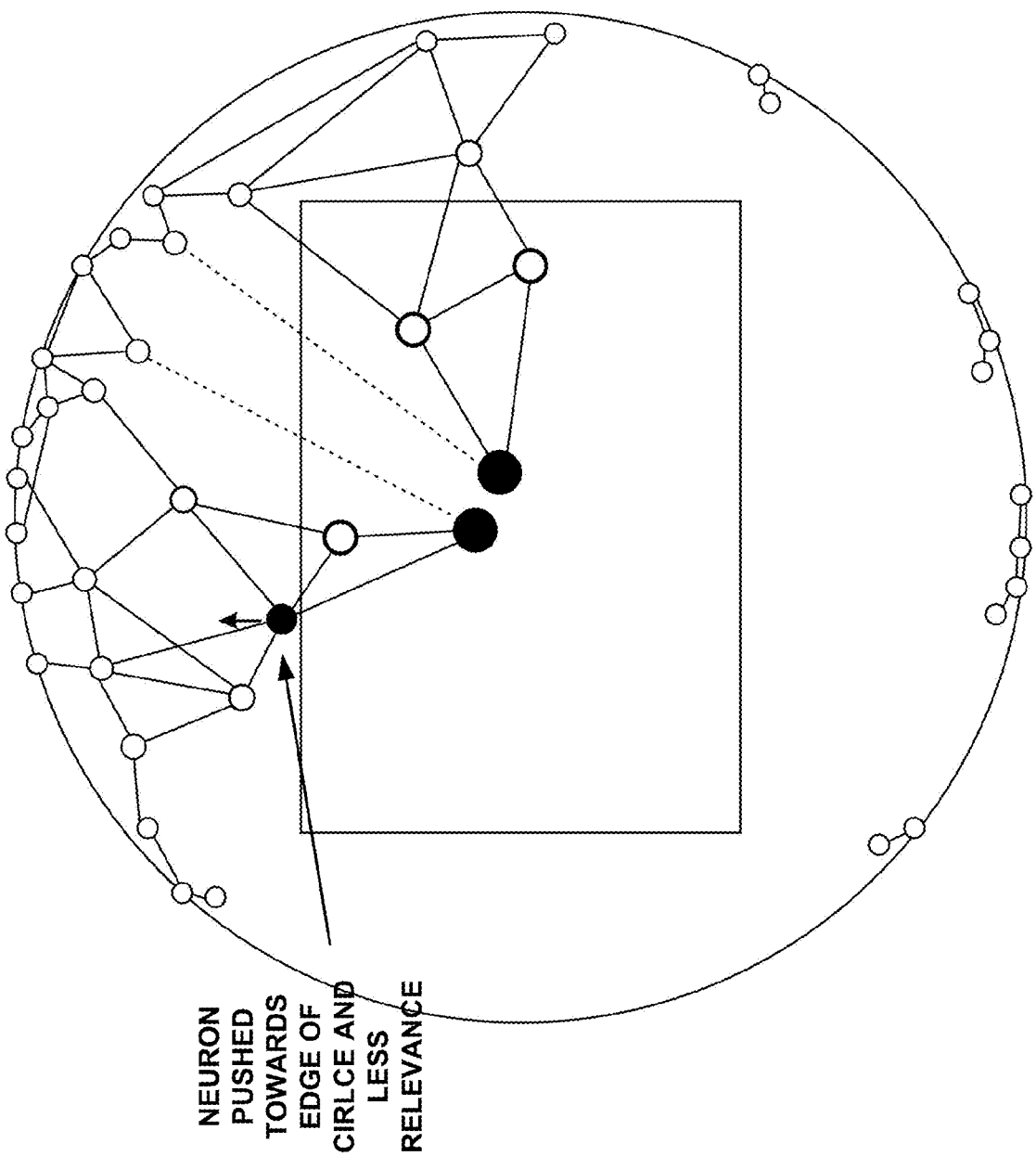
Figure 3E:
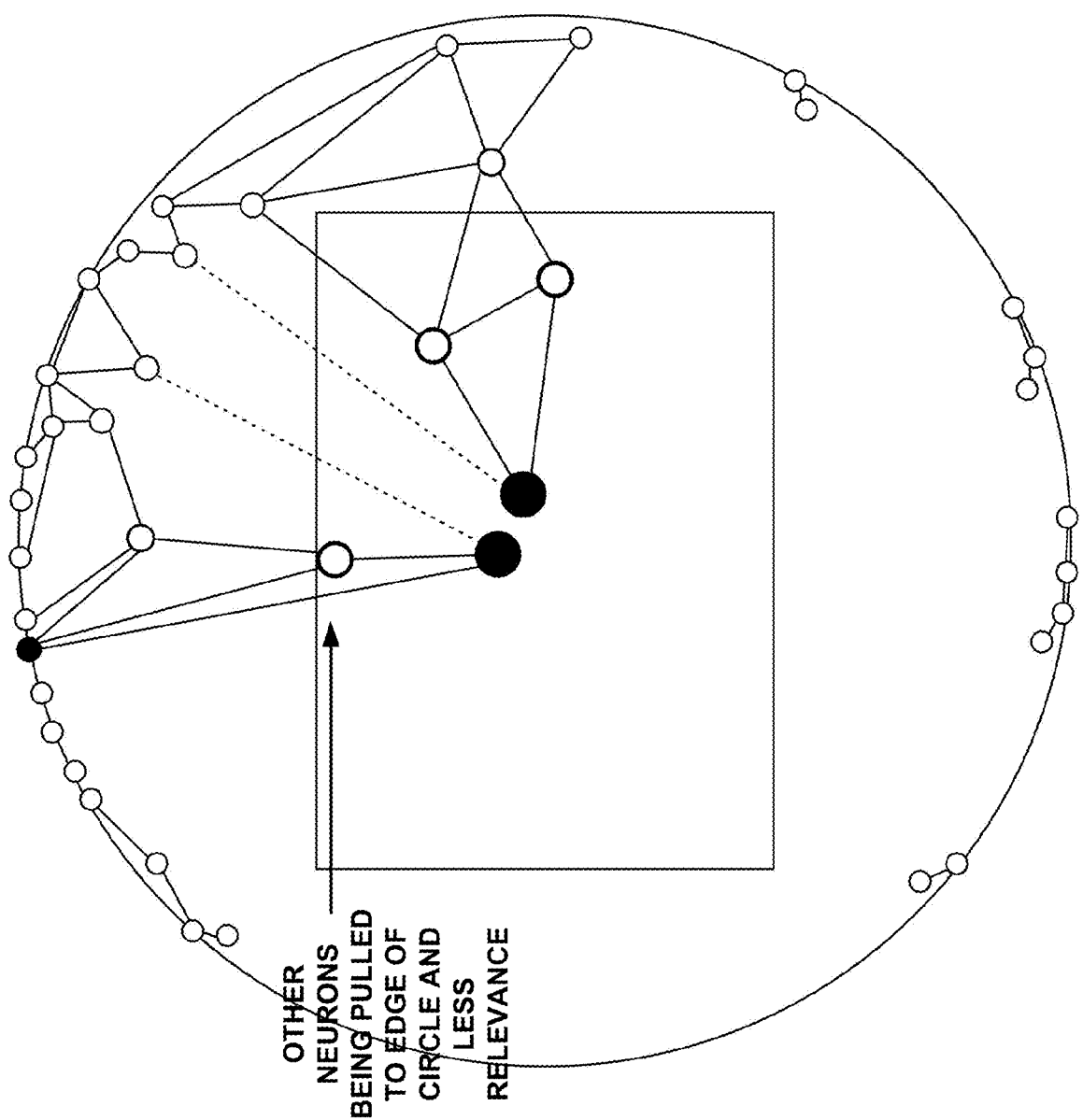
Figure 4A:
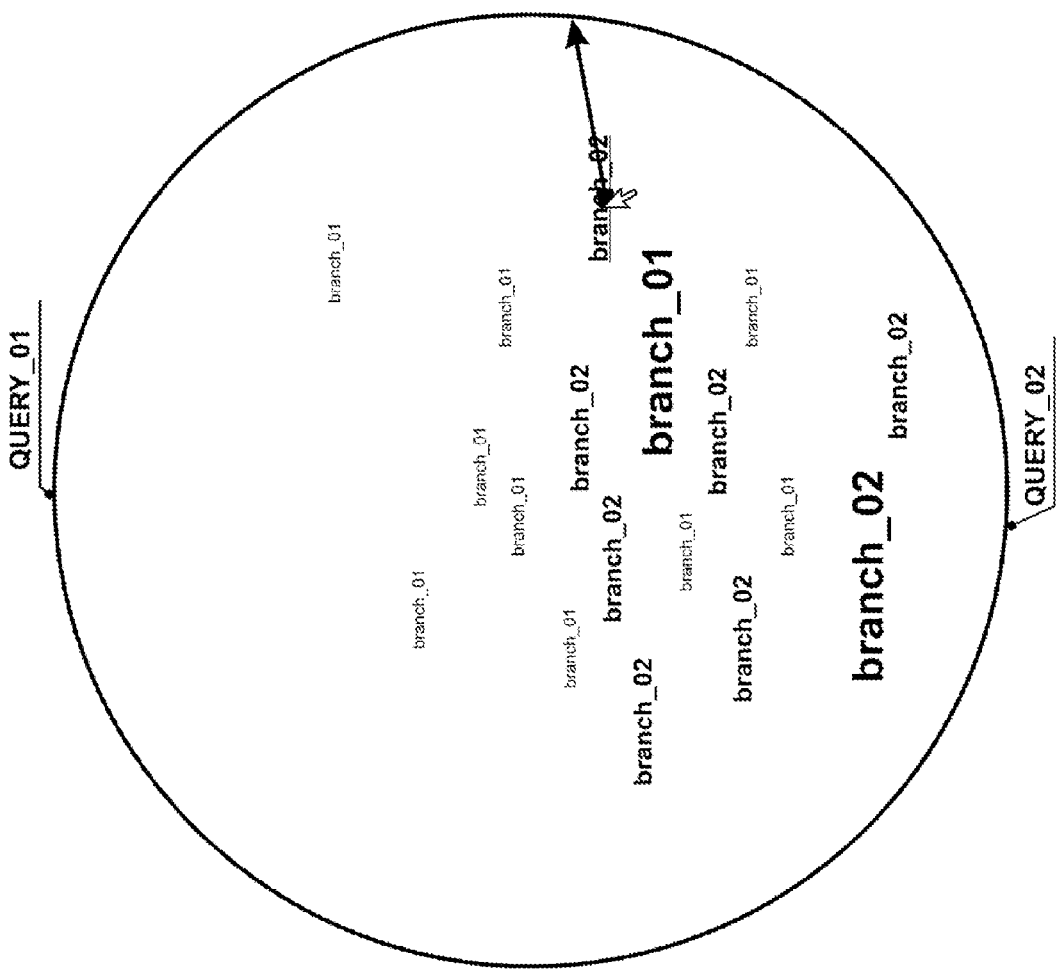
FIGS. 4A-4H shows how a spherical visualization construct can be used.
Figure 4B:
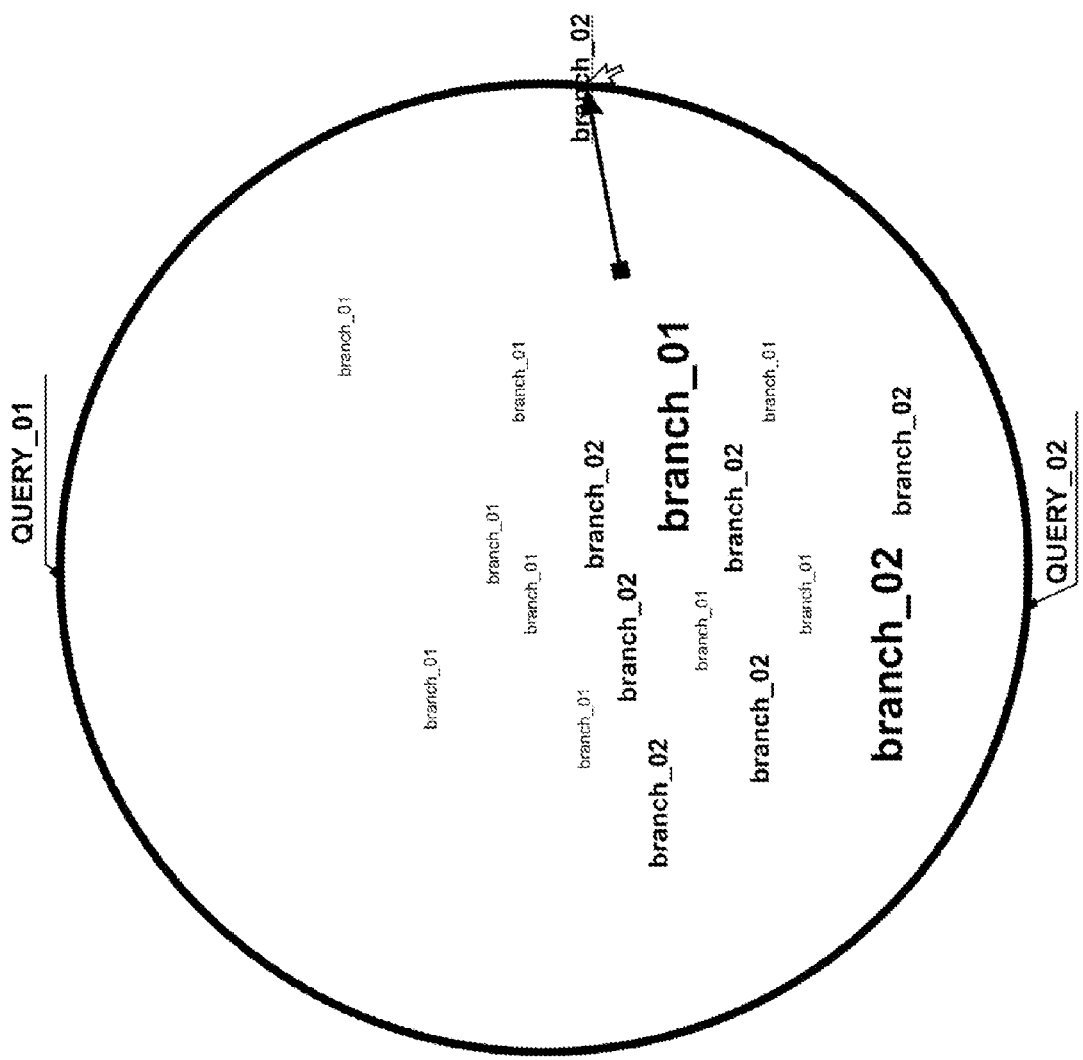
Figure 4C:
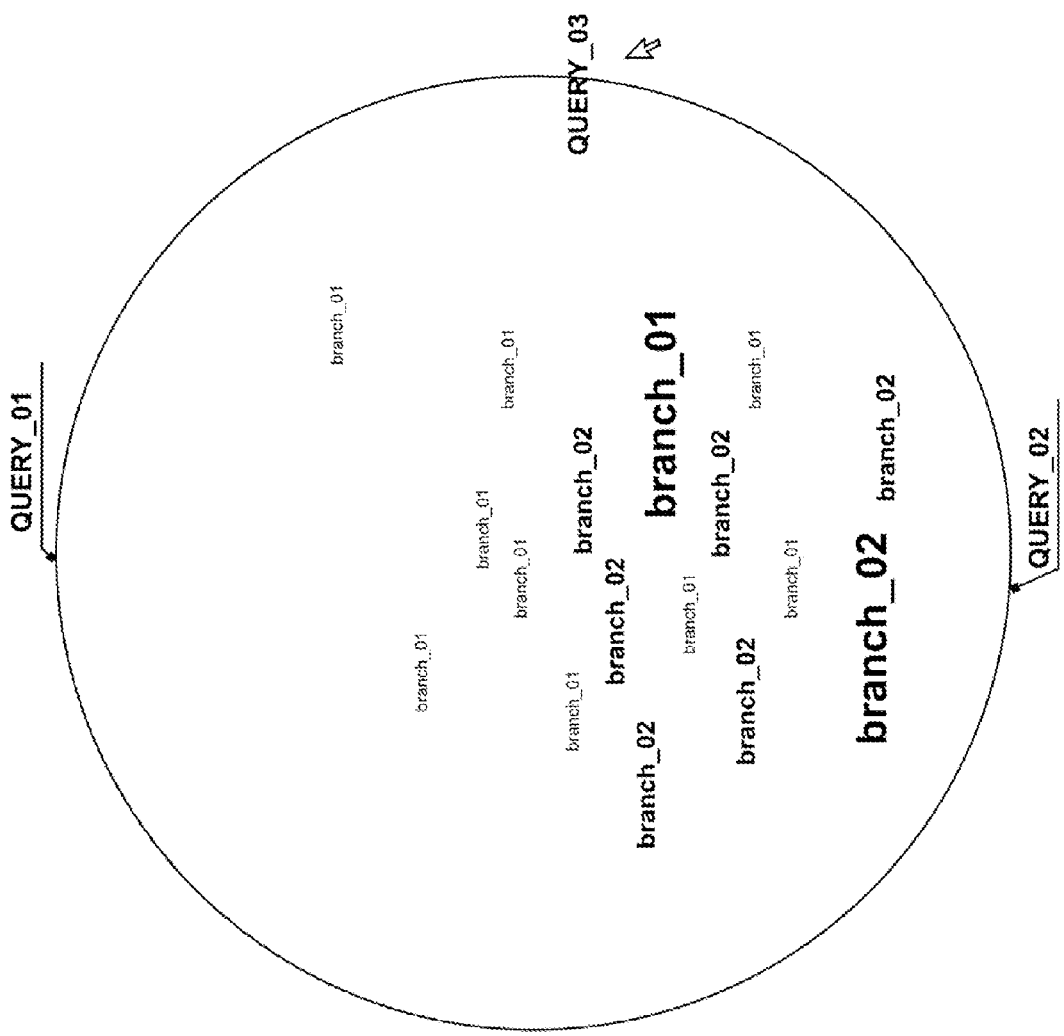
Figure 4D:
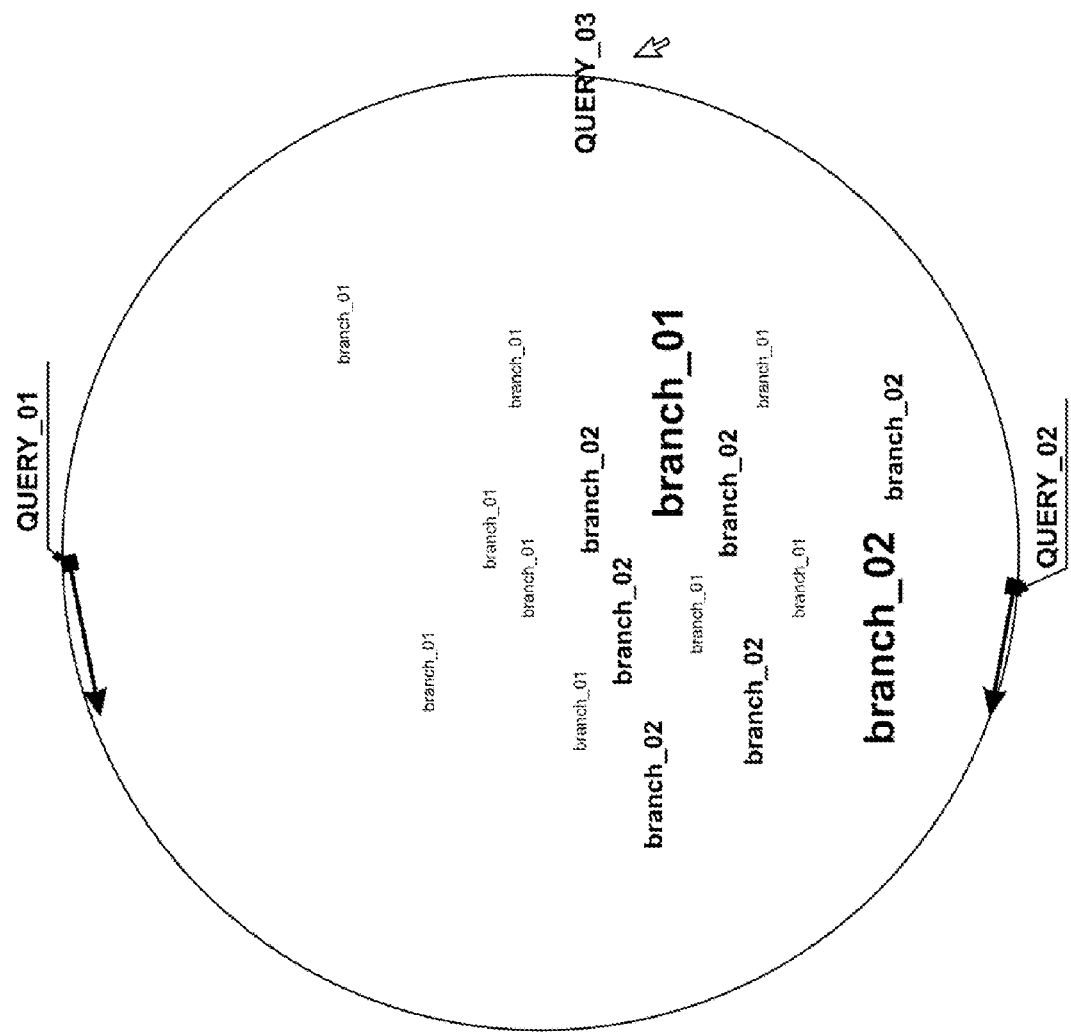
Figure 4E:
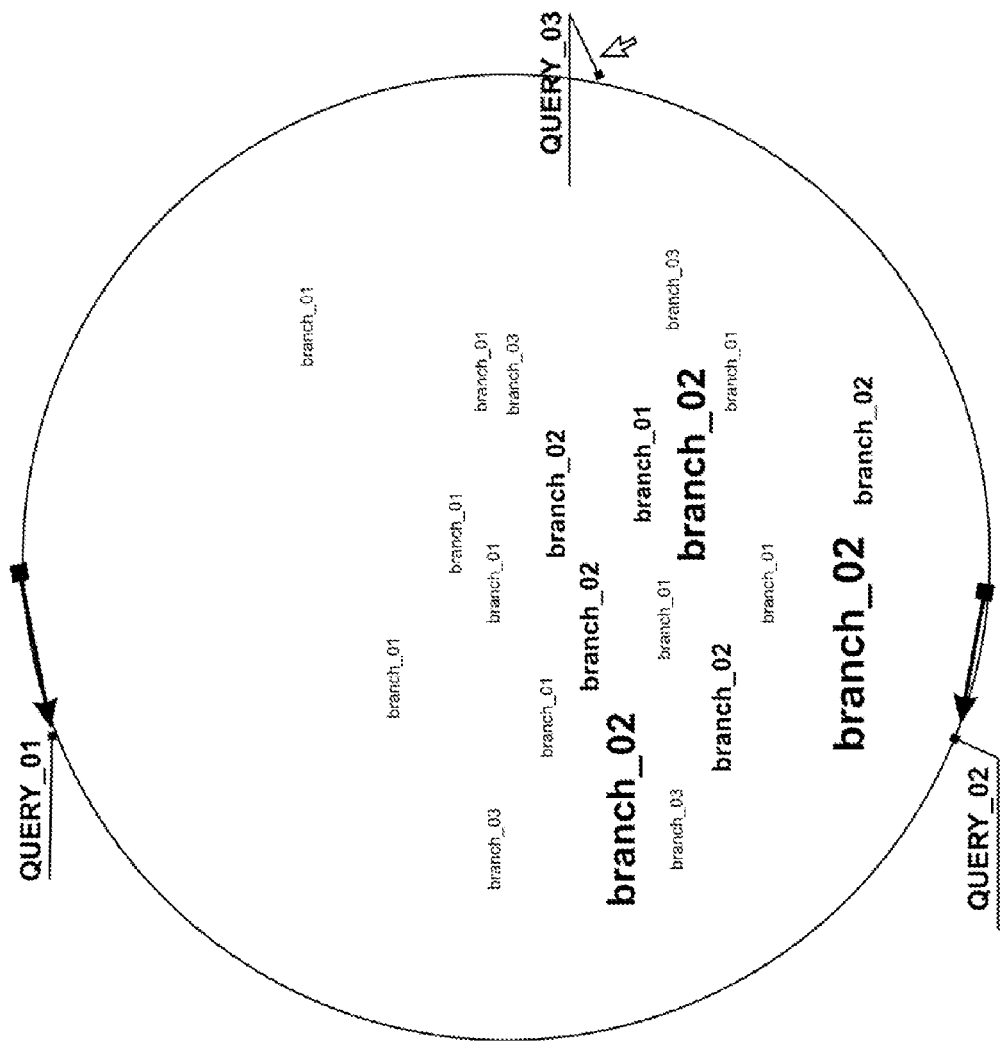
Figure 4F:
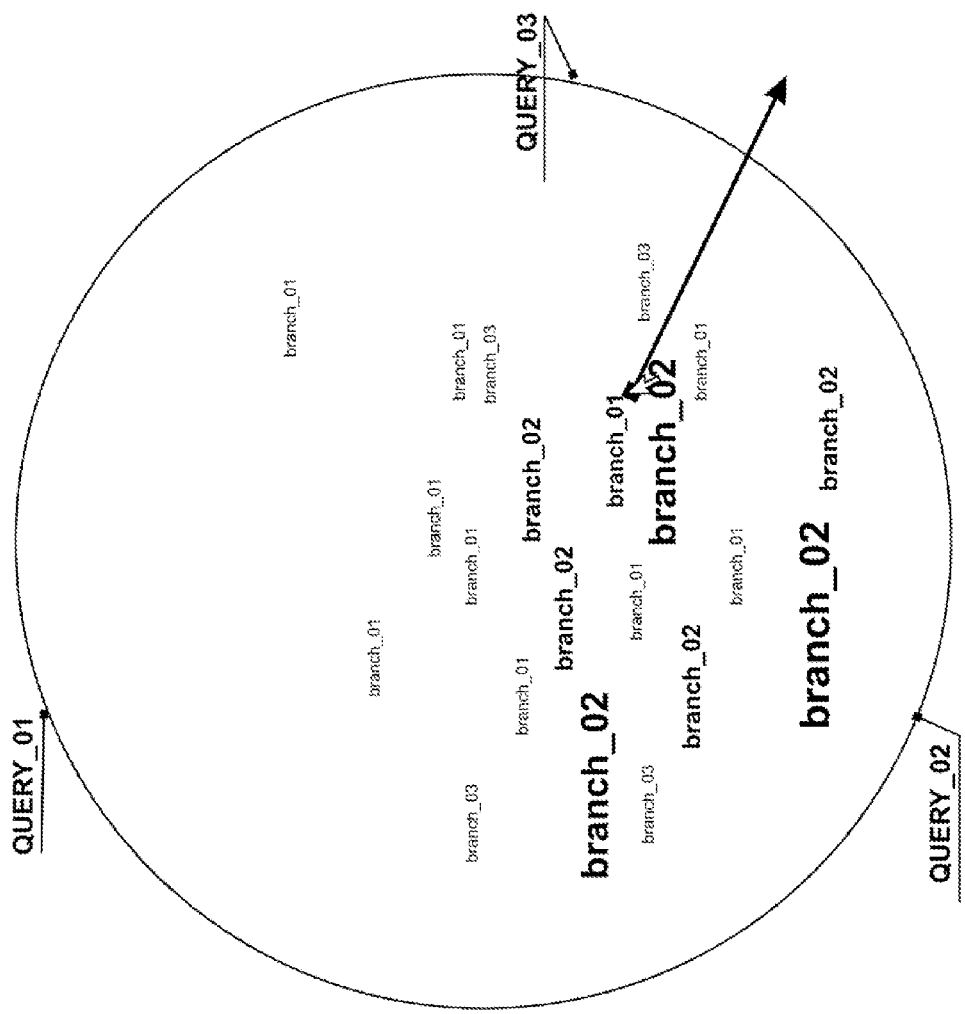
Figure 4G:
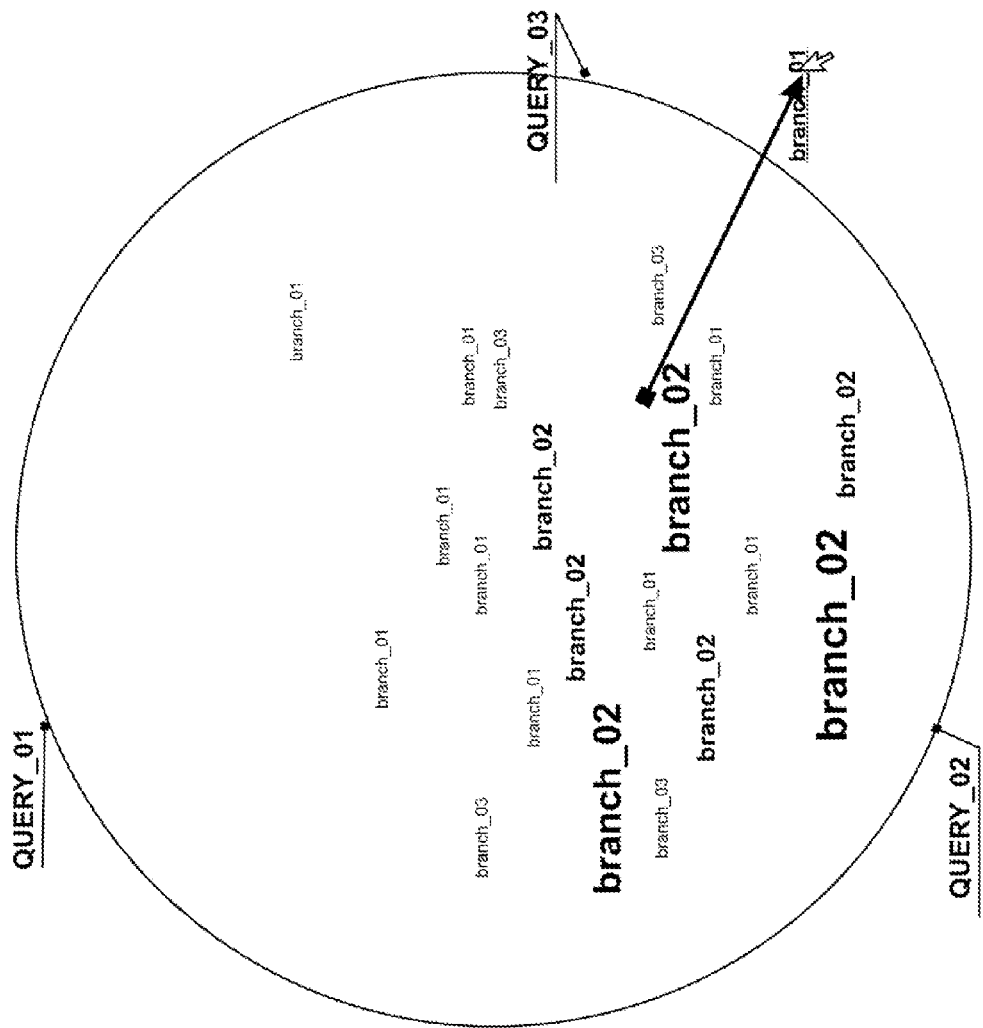
Figure 4H:
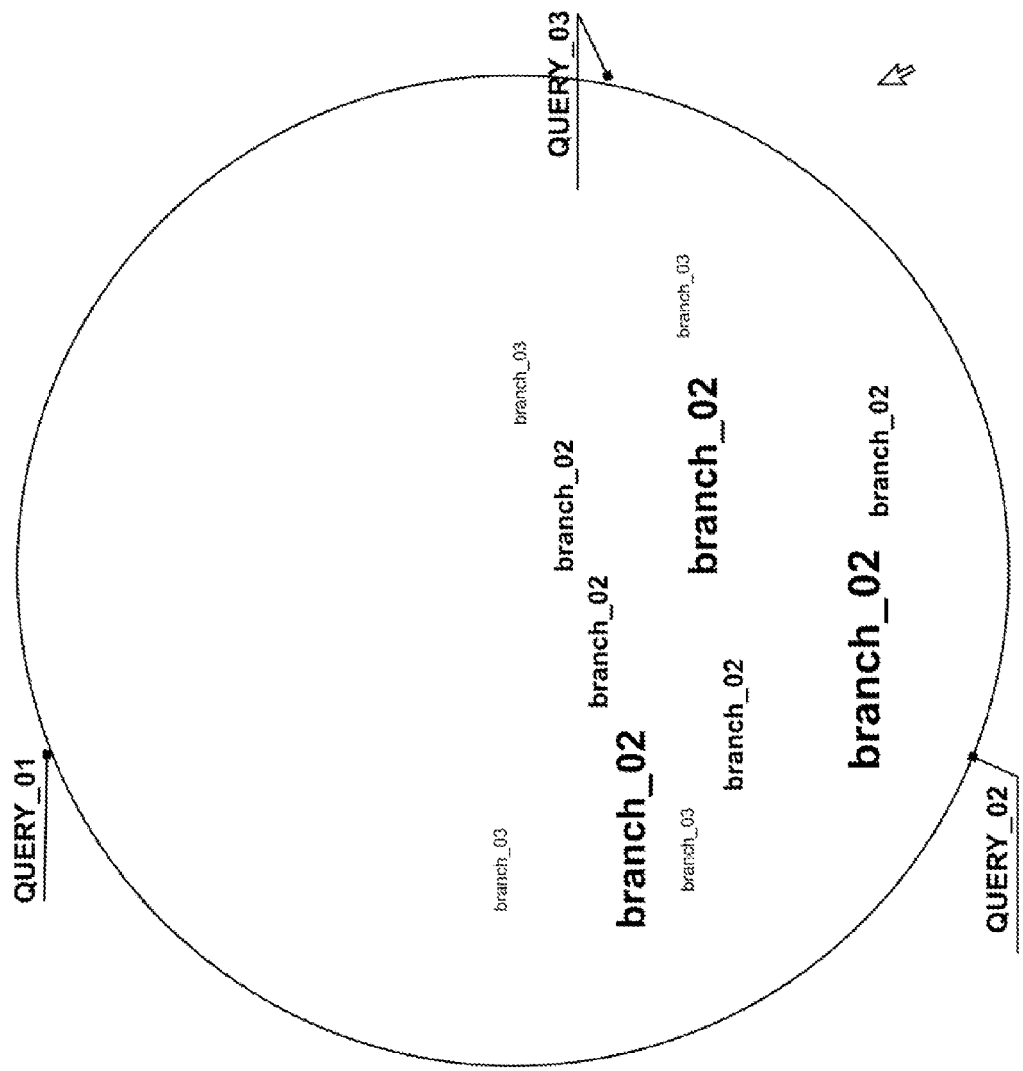

FIGS. 3A-3E represent another variation on a two-dimensional search visualization construct. Initially, the neurons are scattered over the inner "surface" of the circle, as shown in FIG. 3A. Similar to the discussion above, the relevant neurons are pulled by the user towards the center (see FIGS. 3A, 3B, 3C), and the irrelevant neurons are pushed back towards the circle (see FIGS. 3D, 3E).

A pyramid is only one of many three-dimensional constructs that can be used to represent search visualization. FIGS. 4A-4H shows how a spherical visualization construct can be used (in essence, an "inverted" three-dimensional version of FIGS. 3A-3E). FIGS. 4A-4H are intended to be viewed as a sequence of images seen by the user on a screen.

In this case, the "rubber ball" is initially scattered, or "exploded," over the surface of a sphere, where the neurons may be clumped together based on their relationships (connections) to each other, but, in the absence of a query, are all irrelevant and therefore located on the (inner) surface of the sphere. Just as in the case of a pyramid of FIGS. 2A-2F, and the two-dimensional "mountain peak" version of FIGS. 1A-1F, the most relevant neurons are initially pushed towards the center by the query (and then by the user), while the less relevant ones are pulled back towards the inner surface of the sphere. As noted above, this visualization approach is "inverted," or turned "inside out" compared to FIGS. 3A-3E. Here, instead of the surface of a sphere (or circle) representing maximum irrelevance and the center representing maximum relevance, the visual construct can be inverted, such that irrelevant neurons all "clump" in the center of the sphere, while the user pulls the most relevant neurons towards the surface of the sphere. In essence, the center of the sphere is used in this construct as analogous to a point of the pyramid that is infinitely far (and therefore maximally irrelevant), in the pyramid construct.

Furthermore, other three-dimensional constructs can be used. For example, a cube (or other polyhedrons) can be used, in effect combining the pyramid and the sphere visualization constructs, where the surface of the cube represents relevance, and the center of the cube represents irrelevance. The user can pull those neurons he considers relevant towards the surface of the cube, from the original "clump" of neurons in the center of the cube. The cube (or polyhedra, or ellipsoids of rotation) construct can also be inverted "inside out" (similar to the discussion above with reference to the spherical construct), with the surface representing irrelevance, and the center representing relevance.

In addition to position of the neuron within the construct (pyramid, sphere, circle, cube, etc.), other visual aids can be used to indicate relevance. For example, font size (larger font meaning more relevant, smaller font meaning less relevant), color (for example, red meaning more relevant, blue meaning less relevant), font transparency (the less relevant, the more transparent), various animation technique (blinking to indicate high relevance, etc.). Some of these visual aids are shown in FIGS. 4A-4H.

As yet another aid to the user, icons, or pictograms, can be associated with the neurons, to be dragged or moved together with the neuron. For example, the object "apple" representing the fruit apple can have an icon showing an apple next to it. Similarly, the object "Apple Computer" can have a computer icon, or pictogram, next to the neuron.

On a somewhat more general level, the question of how to define context within the framework on the neural network can be addressed by any of:

(1) Keywords (2) Fragments of text (e.g., sentences, paragraphs, portions of documents)

(3) Documents

Each of these methods assumes, as a practical matter, two types of operations: the element is present, the element is not present. This corresponds to connection weights of +1 and −1. Also, intermediate values can be used, such as:

| Granularity | Value |
| --- | --- |
| Element must be present | +1 |
| Element is preferably present | +0.5 |
| Presence of the element does not matter | 0 |
| Element should preferably be absent | −0.5 |
| Element must be absent | −1 |

This is a relatively coarse granularity, and in reality a large number of discrete steps (in steps of 0.25, or 0.1, or 0.05, etc.) can be used. The user, in addition to dragging the neurons using a mouse to indicate relevance or irrelevance, can also set the value of the connection manually using a mouse and a pop-up menu (for example) that pops up upon clicking on a connection.

To manage context during search, as well as to enable various other functions related to searching, a number of auxiliary functions for working with the neural network can be provided, such as:

(1) generation of keywords that are relevant to the query;

(2) generation of key sentences (documents) relevant to the query (3) generation of clusters of relevant documents (clusterization)

(4) document annotation.

These functions are applicable to both a single element/neuron/word/keyword/document, and to a set of elements that represents keywords, key sentences, key documents. Examples of various combinations (using a coarse granularity) are shown in the table below:

| Words | Sentences/documents |
| --- | --- |
| 0 | 0 |
| 0 | + |
| 0 | − |
| 0 | +− |
| + | 0 |
| + | + |
| + | − |
| + | +− |
| − | 0 |
| − | + |
| − | − |
| − | +− |
| +− | 0 |
| +− | + |
| +− | − |
| +− | +− | where "0" means "not used," "+" means "included element" (i.e., analogous to Boolean AND), "−" means "excluded element" (i.e., analogous to Boolean NOT), "+−" means either combination of both elements. One skilled in the art will readily appreciate how the table above (which only shows a few combinations out of many) can be adapted to finer granularity (steps of 0.5, 0.25, etc., as discussed above).

Furthermore, the various visualization constructs described above, as well as others, can be available to the user in the form of different "skins."

FIGS. 6-17 illustrate how the visualization techniques discussed above can be applied to implement "one click searching." As will be readily appreciated, a user would prefer to use as few keystrokes or mouse operations as possible, in order to find the most relevant results. To solve the problems of standard search engines, a GUI for building complex search queries is proposed. One-click GUI for building search queries can work, for example, on the following principle:

1. perform a search using a search engine, whether a proprietary local engine or database, or a third party search engine;
2. get N results;
3. place those N results on a map (illustrated in the figures discussed above, and also, e.g., in FIG. 7, left half, for visualization
4. give the user the option to search again, based on the map, using third party search engines (or the local search engine), or continue manipulating existing results using the map After a user's input of a standard query, the system directs the user to a standard search engine and receives a pre-defined number of results (e.g., 250, or 500 or 1000).

Then, the system analyzes these result annotations, e.g., using with a statistical method or more complex algorithms (building a semantic network, using morphology, neural networks, clusterization, etc.) and extracts additional keywords (word-word combinations-phrases).

Further, these keywords are placed graphically on a word map, thus showing the user the search system's associations with the query. Keyword proximity on the map can correspond to word proximity (frequent hit words, or those close in meaning, such as synonyms should be close, rare or absent words shall be far apart). Also, the map can show the importance of extracted keywords for the query, e.g., with a font size, color, font type, transparency, etc. Query words (word-combinations-phrases) can also be shown on the map—e.g., dedicated with a special size, spelling or color.

The user can do the following with the words on the map:
 add words to the query—e.g., with a simple mouse click or through the contextual menu,
 add a word to a list of excluded query words—from the contextual menu or with a mouse click on a special sign or icon (e.g. a dagger) next to this word, or on the word itself,
 delete words from the map—from the contextual menu or with a mouse click on a special sign or icon (e.g., a bold dagger or an "x") next to this word. This word can be placed in a special list of words that shall not be shown at later queries,
 delete words from the query—e.g., with a simple mouse click on the query word or from the contextual menu.

With any map changes the initial result list is automatically rebuilt, in other words, based on the map changes, the results are resorted. For example, adding a query word leaves in the result list only documents with annotations (headlines, titles or URLs) containing both initial query words and the newly added word. Alternatively, adding a word to the excluded list results only in documents with annotations (headlines, titles or URL) without the excluded word. Thus, the user refines his query with one click—he can quickly, intuitively and comprehensively find the "right" document which can be in the initial results on any page—even if the search engine's output placed that document at number 490 or 990.

Rebuilding search results can occur parallel to any map change automatically rebuilding an advanced query in the chosen search engine query language. The user can, at any time, send a newly created query to get its relevant documents. With the information indexed by search engines, a newly found hit result may not be contained in the documents of the initial query.

Also, the system can work in a mode when the query is formed not only of the words the user specified as desirable or, on the contrary, excluded. Query synonyms shall also be added to the query, and there can be an exclusion of words synonymous with those excluded by the user.

The following examples will demonstrate how the one click searching interface can be used. First, consider finding all possible links referring to jaguar, the animal, using, in this case, a search engine from Yahoo!, see FIG. 6.

The initial query 'jaguar' yields 250 of best results found by Yahoo! Search hits devoted to Jaguar the car are positioned first on the list, see FIG. 7. The map in FIG. 7 also displays both the words devoted to car models and accessories, and animal-related context. As the reader will appreciate, the earlier discussion of "rubber bands," pulling up relevant neurons, and pushing down irrelevant ones applies to this form of interface as well—these are conceptual constructs that are useful to keep in mind as the "behind the screen" mechanism of how the map works.

Figure 8:
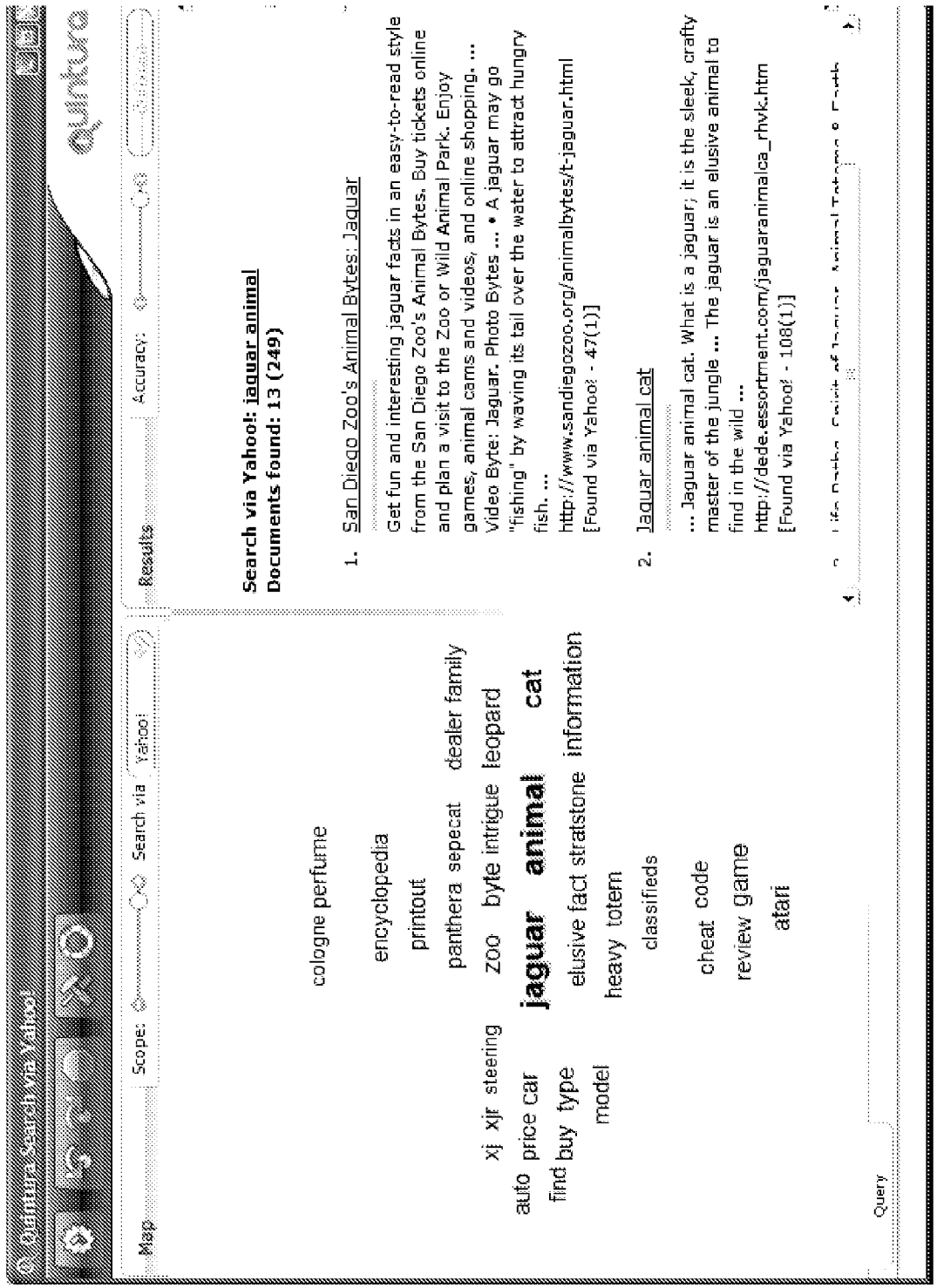
Figure 9:
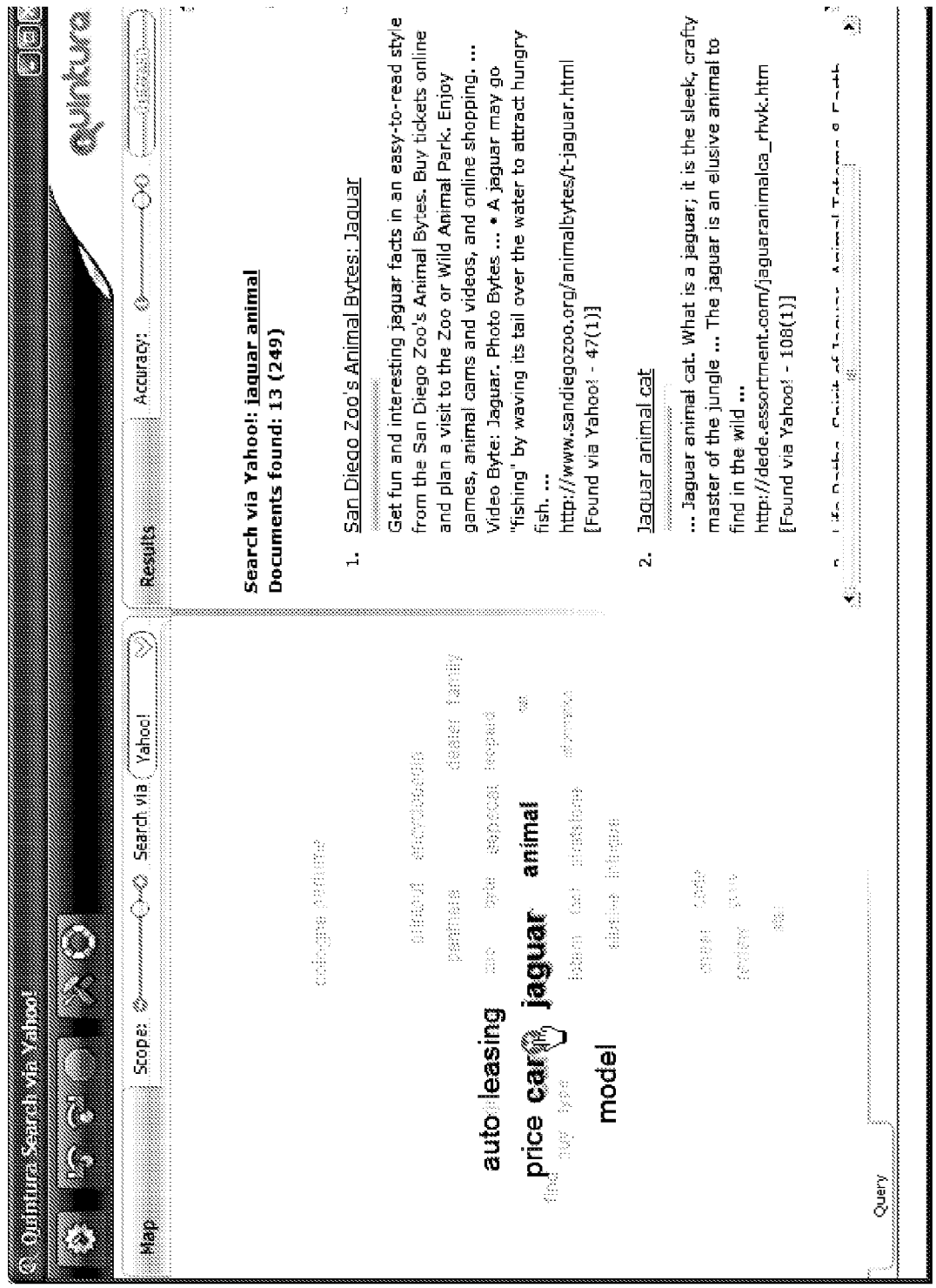

To get rid of the links devoted to Jaguar the car, the user can add any of wildlife-related words to the query, such as 'animal'. The map in FIG. 8 is updated so that for the most part it displays the words related to jaguar the animal. However, only 13 links containing 'jaguar' and 'animal' remain now. If more documents are needed, before searching the web again, car-related context should be excluded from the query, by deleting 'car' (clicking the "X" button next to the word "car").

Figure 10:
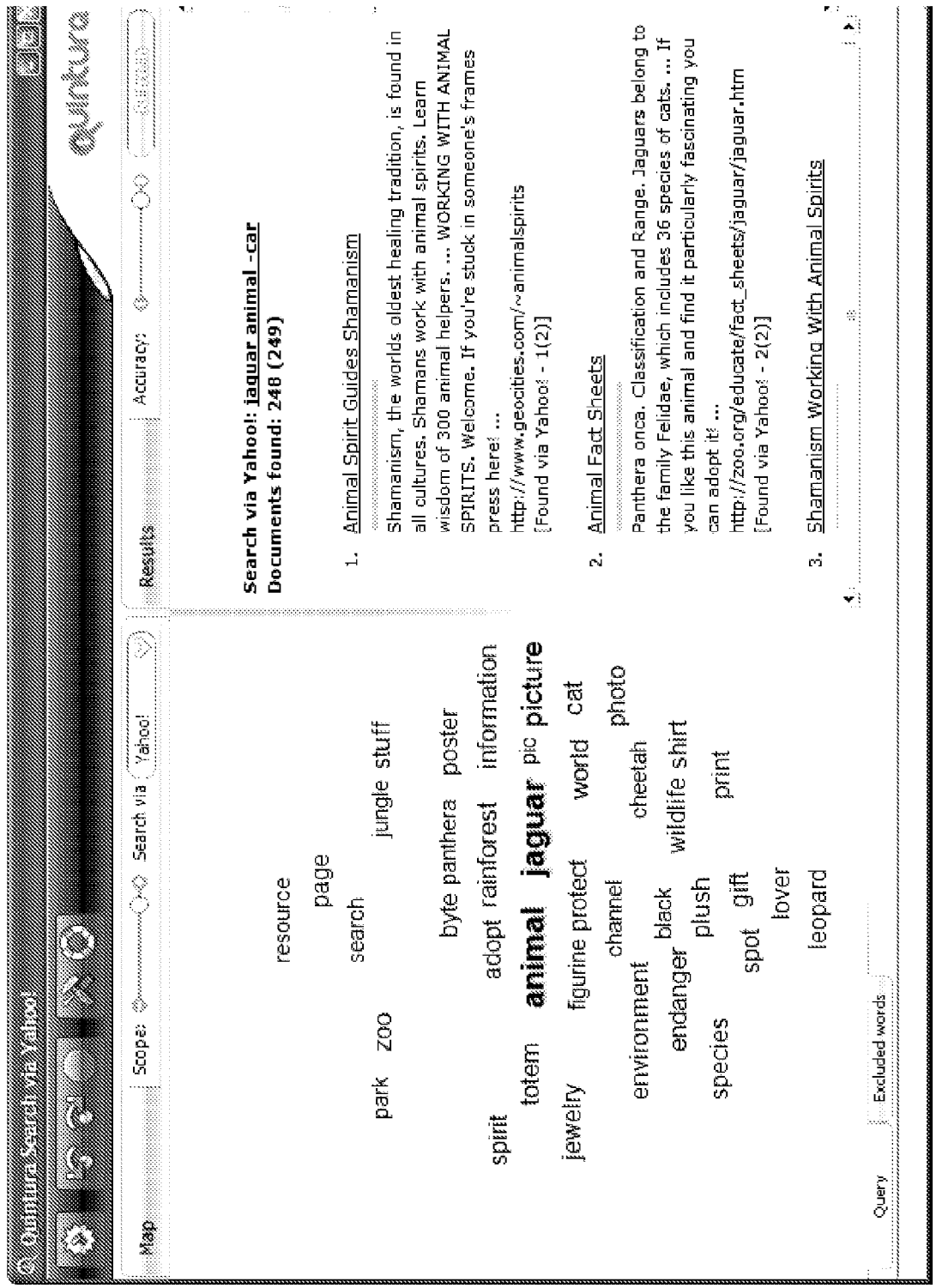

By clicking "Refresh," more results are downloaded for the current query ("jaguar animal-car," see FIG. 9) and additional context for the topic is displayed in FIG. 10. Now the user can go further on and add a couple of new words to make the query more specific.

Another example is finding information regarding excavating Troy. Few people remember the name of the archeologist who excavated Troy. So, the user can start with a single word "Troy," see FIG. 11.

Figure 12:
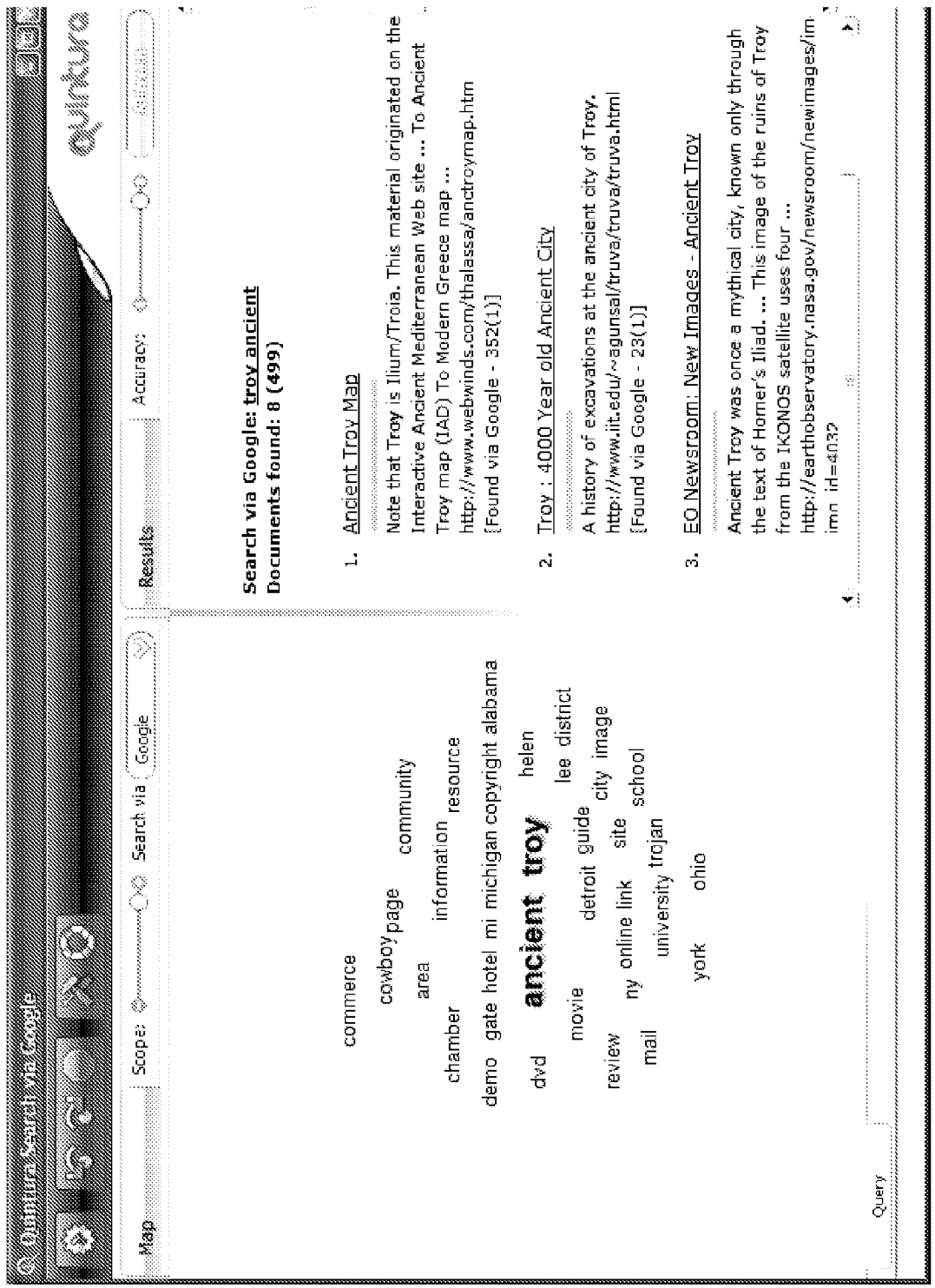

The visual map displays several US state names, so ancient Troy can be confused with multiple modern Troys in the U.S. To distinguish between these cities, "ancient" can be added to the query, see FIG. 12.

Figure 13:
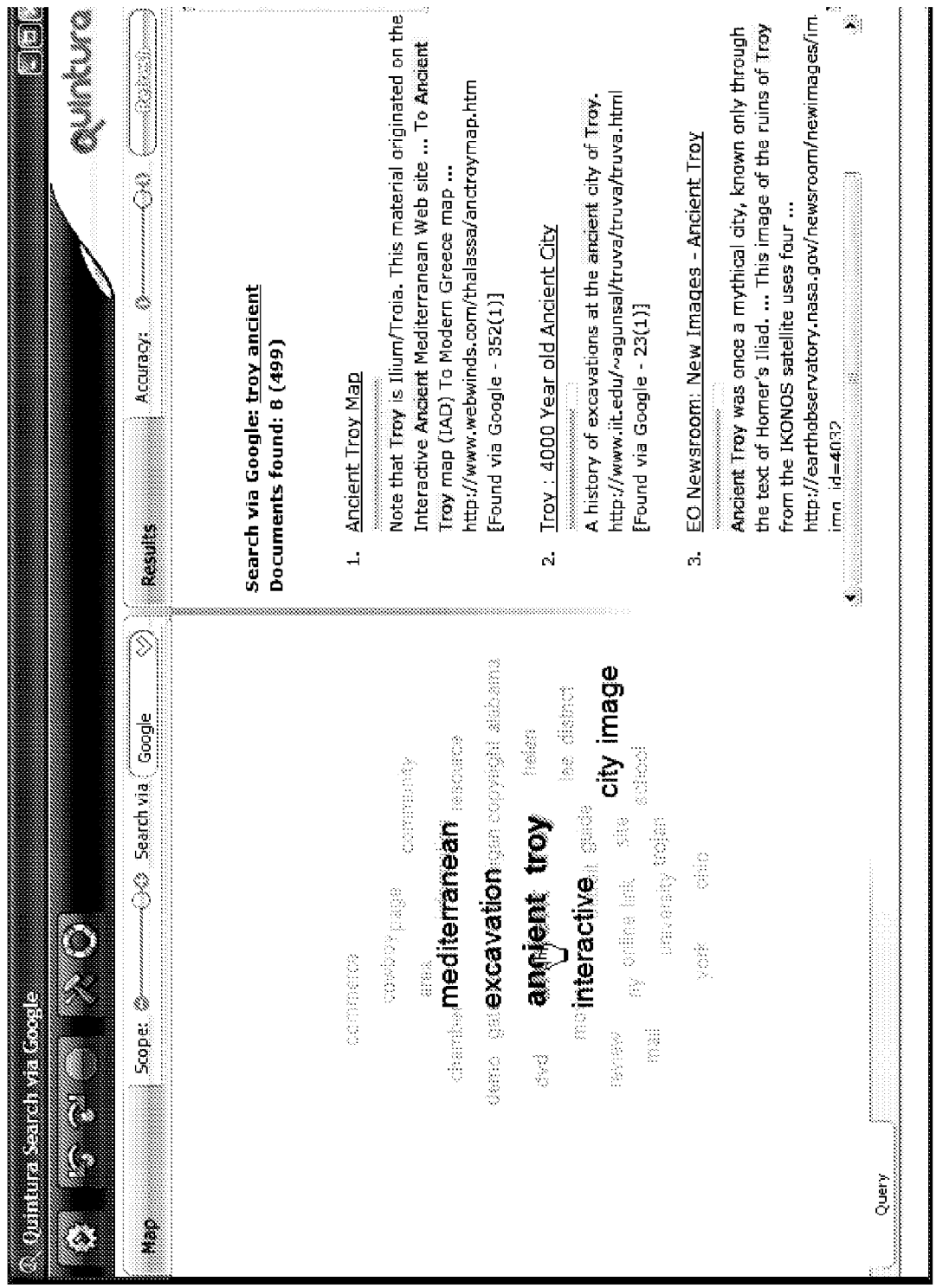
Figure 14:
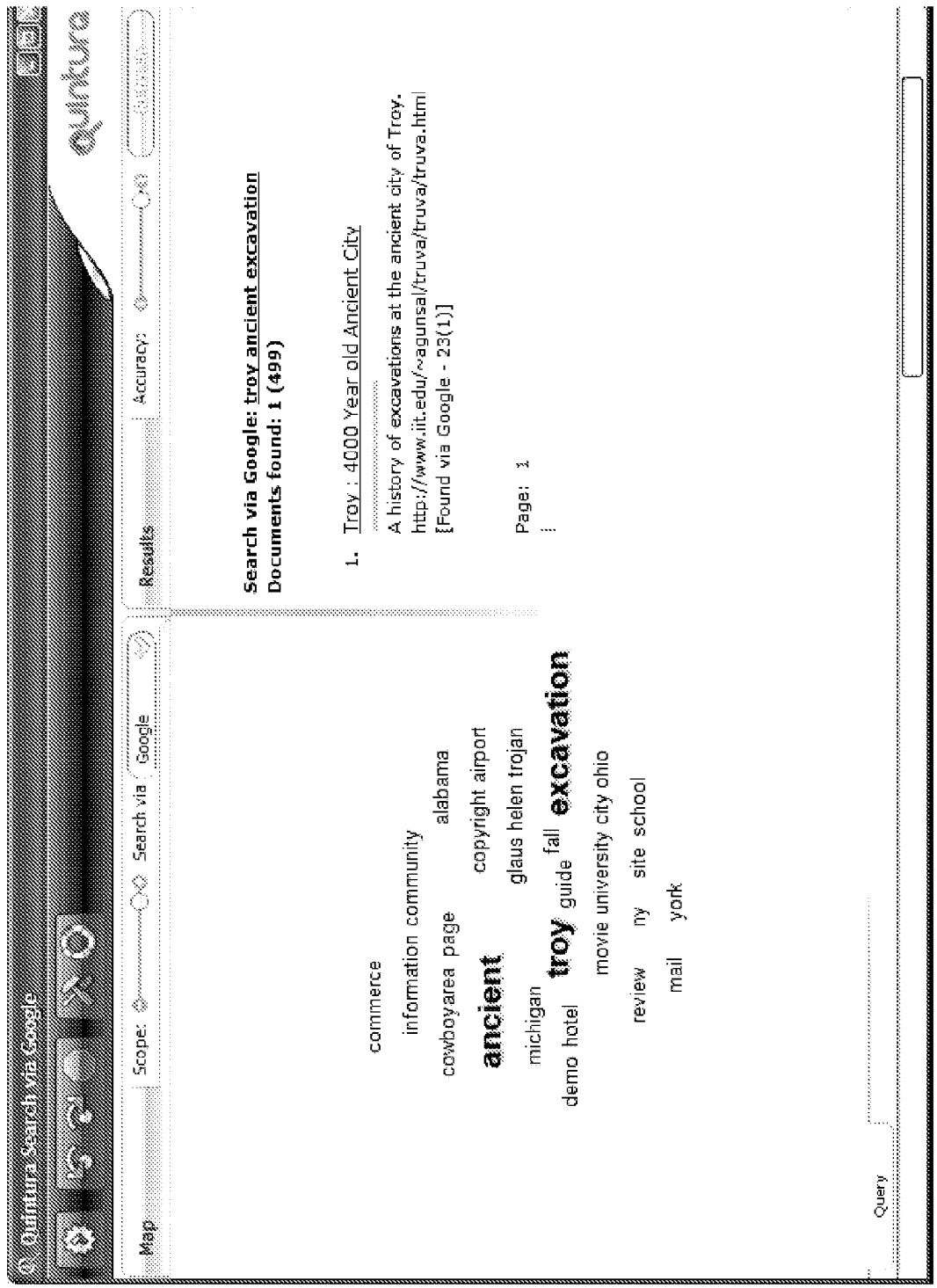
Figure 16:
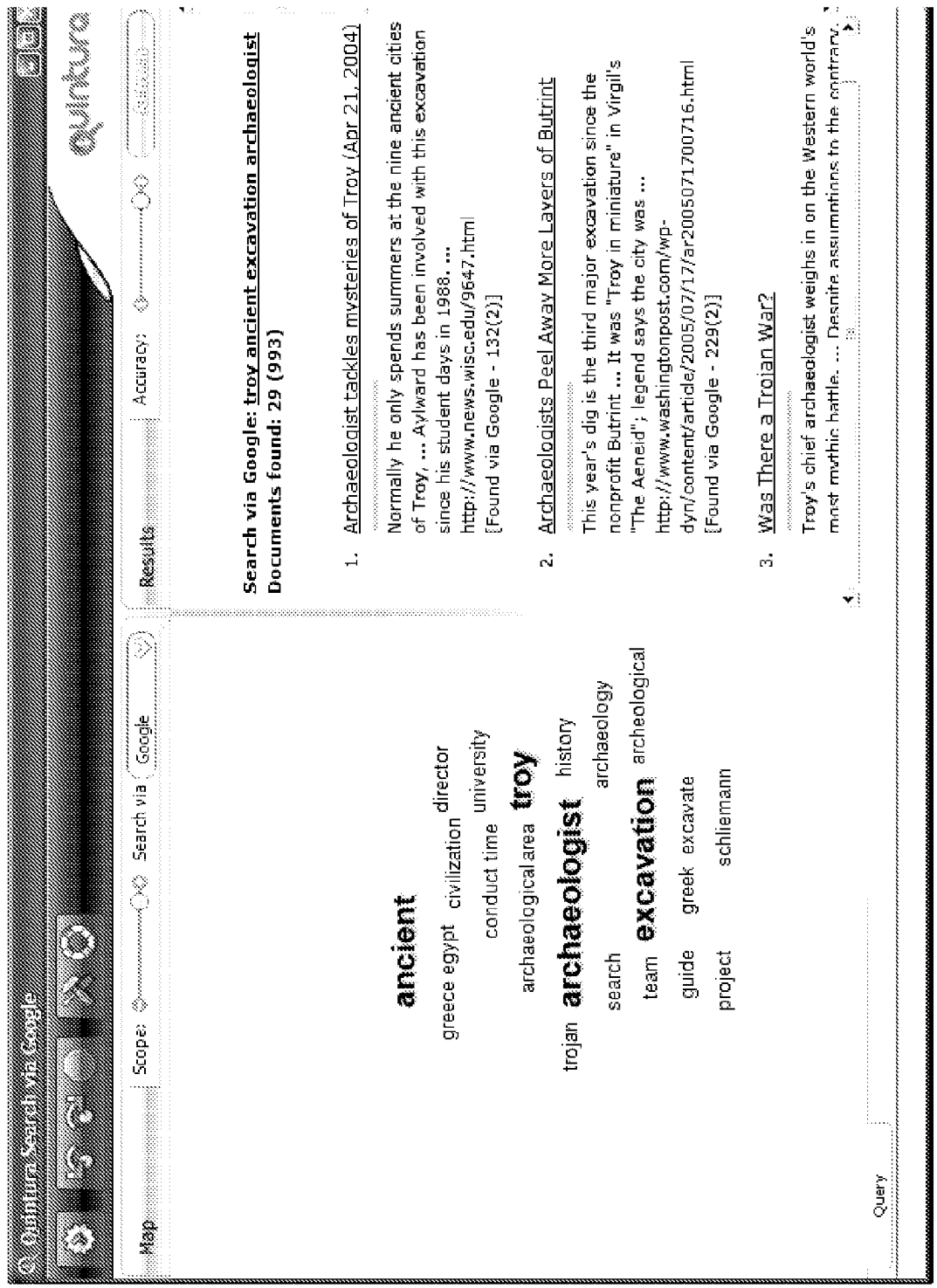
Figure 17:
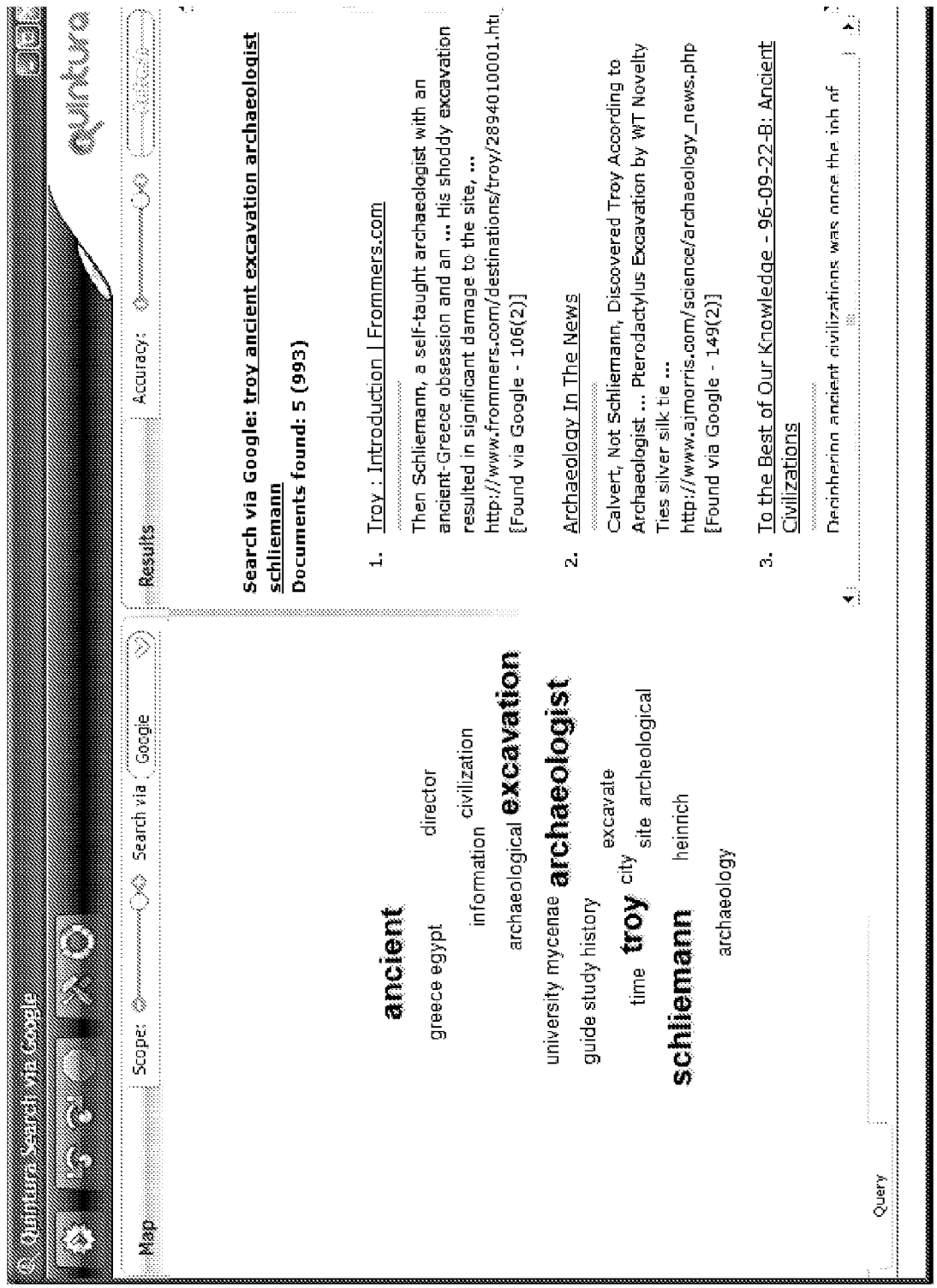

Now, pointing to "ancient" shows the related words, see FIG. 13:

By clicking "excavation", it is added to the query, and the number of documents is reduced, see FIG. 14.

Of the first 499 downloaded results, only a single result is left. Clicking "Refresh" to search via Google again and download the next portion of results, produced FIG. 15.

The new query retrieves 501 results and many new words. The word "architect" can be added to the query, see FIG. 16. After this step, the search results show the name of the archeologist who excavated Troy. As soon as the user clicks on "Schliemann," the list of results is updated to display the appropriate links, see FIG. 17.

Additionally, the user can have further options for managing the context of the search. With the maps in the figures in mind, for example, the user can bring the cursor over any of the words that are displayed, but not part of the initial query, making that word temporarily relevant. The set of documents on the right of the map can be re-displayed, with possibly different documents being more relevant to the current temporary search context (and shown at the top), compared to the previous result. Also, by holding the cursor over the word, other associated words (i.e., words and/or objects that have connections to that neuron) can be temporarily displayed. Moving the cursor away from the particular word returns the search results display to the previous state (and the words connected to this neuron disappear). Also, when the cursor moves to the right portion of the screen (where the search results are displayed), the "temporary" query can be "frozen" during that time, until the cursor moves back to the map portion of the display.

Clicking on the word adds it to the query, making the change and the associated display of the results on the right "permanent." Clicking on the "x" next to the word that was not part of the search query in effect performs a Boolean AND NOT for that search term, possibly resulting in a different set of documents displayed on the right of the screen.

As yet another option, instead of, or in addition to, links and/or annotations, keywords generated from the documents can be displayed in the right half of the screen, for example, next to the links.

As will be understood by one of ordinary skill in the art, the exact arrangement of the map and document link display need not be exactly as shown in the figures, for example, the map can be on top of the screen, and the search results displayed on the bottom, or vice versa, or the left and right (map-search results) reversed as well, or any number of other arrangements.

Figure 5:
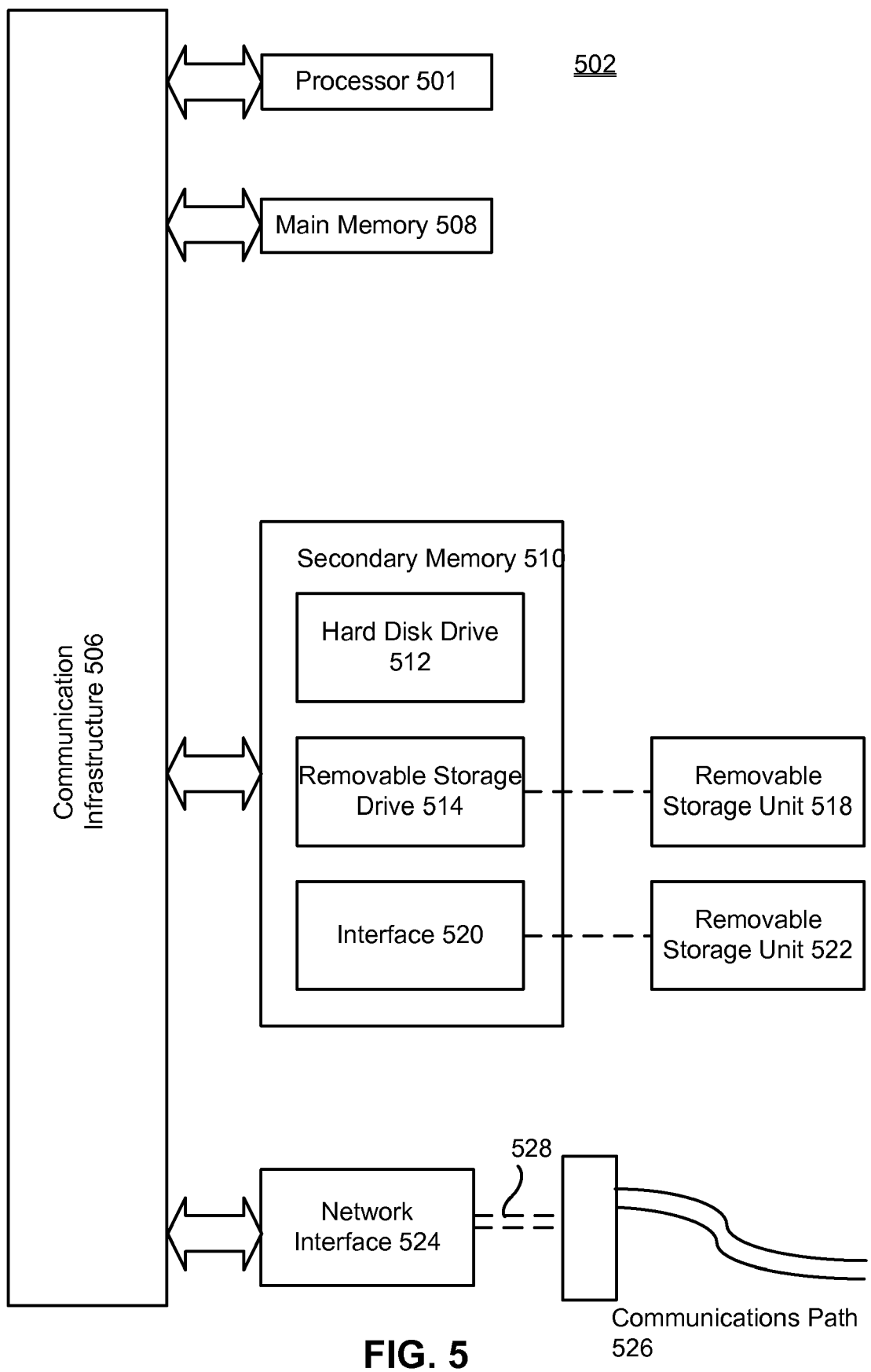
FIG. 5 shows an example of a computer where the neural network can be implemented.
Figure 6:
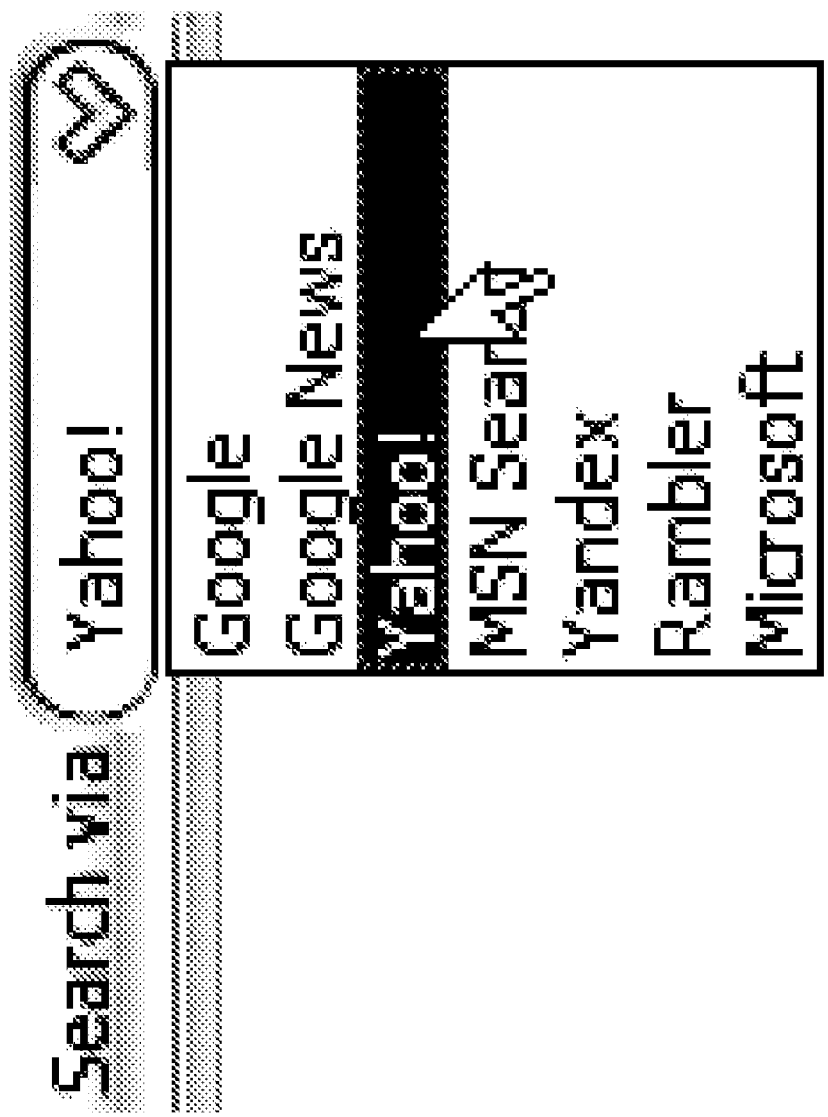

An example of a computer 502 where the neural network can be implemented is illustrated in FIG. 5. The computer 502 includes one or more processors, such as processor 501. The processor 501 is connected to a communication infrastructure 506, such as a bus or network). Various software implementations are described in terms of this exemplary computer system. After reading this description, it will become apparent to a person skilled in the relevant art how to implement the invention using other computer systems and/or computer architectures.

Computer 502 also includes a main memory 508, preferably random access memory (RAM), and may also include a secondary memory 510. The secondary memory 510 may include, for example, a hard disk drive 512 and/or a removable storage drive 514, representing a magnetic tape drive, an optical disk drive, etc. The removable storage drive 514 reads from and/or writes to a removable storage unit 518 in a well known manner. Removable storage unit 518 represents a magnetic tape, optical disk, or other storage medium that is read by and written to by removable storage drive 514. As will be appreciated, the removable storage unit 518 can include a computer usable storage medium having stored therein computer software and/or data.

In alternative implementations, secondary memory 510 may include other means for allowing computer programs or other instructions to be loaded into computer 502. Such means may include, for example, a removable storage unit 522 and an interface 520. An example of such means may include a removable memory chip (such as an EPROM, or PROM) and associated socket, or other removable storage units 522 and interfaces 520 which allow software and data to be transferred from the removable storage unit 522 to computer 502.

Computer 502 may also include one or more communications interfaces, such as communications interface 524. Communications interface 524 allows software and data to be transferred between computer 502 and external devices. Examples of communications interface 524 may include a modem, a network interface (such as an Ethernet card), a communications port, a PCMCIA slot and card, etc. Software and data transferred via communications interface 524 are in the form of signals 528 which may be electronic, electromagnetic, optical or other signals capable of being received by communications interface 524. These signals 528 are provided to communications interface 524 via a communications path (i.e., channel) 526. This channel 526 carries signals 528 and may be implemented using wire or cable, fiber optics, an RF link and other communications channels. In an embodiment of the invention, signals 528 comprise data packets sent to processor 501. Information representing processed packets can also be sent in the form of signals 528 from processor 501 through communications path 526.

The terms "computer program medium" and "computer usable medium" are used to generally refer to media such as removable storage units 518 and 522, a hard disk installed in hard disk drive 512, and signals 528, which provide software to the computer 502.

Computer programs are stored in main memory 508 and/or secondary memory 510. Computer programs may also be received via communications interface 524. Such computer programs, when executed, enable the computer 502 to implement the present invention as discussed herein. In particular, the computer programs, when executed, enable the processor 501 to implement the present invention. Where the invention is implemented using software, the software may be stored in a computer program product and loaded into computer 502 using removable storage drive 514, hard drive 512 or communications interface 524.

Having thus described a preferred embodiment, it should be apparent to those skilled in the art that certain advantages of the described method and apparatus have been achieved. It should also be appreciated that various modifications, adaptations, and alternative embodiments thereof may be made within the scope and spirit of the present invention. The invention is further defined by the following claims.

What is claimed is:

1. A system for visualization of context-based search results comprising:

a processor;

a memory operatively coupled to the processor;

computer code in the memory for implementing the following functionality:

a) a plurality of neurons that form a neural network, the neurons being associated with documents and words in the documents, the neurons representing words corresponding to a search query ("word-neurons"), and the neurons representing documents corresponding to the search results ("document-neurons");

b) a plurality of connections between the word-neurons and the document-neurons;

c) means for displaying the word-neurons and the search results to a user, wherein relevance of the word-neurons is indicated by any of font size, text transparency, font color, and animation effects associated with text of at least some of the neurons; and d) means for changing positions of the word-neurons on a display relative to each other based on input from the user, wherein changing a position of one word-neuron relative to other word-neurons also changes positions of other contextually relevant word-neurons, thereby changing a context of the search query and permitting the user to identify different relevant documents, and wherein at least some of the neurons that correspond to objects (concepts) have icons associated with them, the icons corresponding to a meaning of the objects.

2. The system of claim 1, wherein the word-neurons form a first layer, wherein the document-neurons form a second layer, and further comprising a layer of object (concept) neurons and a layer of sentence neurons, and wherein each neuron is connected to some, but not all, of the other neurons.

3. The system of claim 1, wherein the input from the user comprises dragging a word-neuron on a display device.

4. The system of claim 1, wherein the input from the user comprises changing a weight coefficient of a connection between two word-neurons to indicate relevance.

5. The system of claim 1, wherein the word-neurons are displayed in a form of any of: (a) a two-dimensional "mountain peak" diagram, with the most relevant word-neurons located at the top of the diagram, (b) positioned within a pyramid, with the most relevant word-neurons located at the base of the pyramid, and the most irrelevant word-neurons located at the point of the pyramid, (c) positioned within a sphere, with the most relevant word-neurons located on a surface of the sphere, and the most irrelevant word-neurons located at the center of the sphere, (d) positioned within a sphere, with the most irrelevant word-neurons located on a surface of the sphere, and the most relevant word-neurons located at the center of the sphere, (e) positioned within a cube, with the most relevant word-neurons located on a surface of the cube, and the most irrelevant word-neurons located at the center of the cube, (f) positioned within a polyhedron, with the most relevant word-neurons located on a surface of the polyhedron, and the most irrelevant word-neurons located at the center of the polyhedron, (g) positioned within a polyhedron, with the most irrelevant word-neurons located on a surface of the polyhedron, and the most relevant word-neurons located at the center of the polyhedron.

6. A system for visualization of context-based search results comprising:
   a processor;
   a memory operatively coupled to the processor;
   computer code in the memory for implementing the following functionality:
   a) a plurality of neurons that form a neural network, the neurons being associated with words and documents, the neurons representing words corresponding to a search query ("word-neurons"), and the neurons representing documents corresponding to the search results ("document-neurons");
   b) a plurality of connections between the word-neurons and the document-neurons, wherein only some of the word-neurons are connected to each other;
   c) means for displaying the word-neurons to a user, wherein relevance of the word-neurons is indicated by any of font size, text transparency, font color, and animation effects associated with text of at least some of the neurons; and
   d) means for changing positions of the word-neurons relative to each other based on input from the user,
   wherein changing a position of one word-neuron relative to other word-neurons also changes positions of other contextually relevant word-neurons, thereby changing a context of the search query and permitting the user to identify different relevant documents, and
   wherein at least some of the neurons that correspond to objects (concepts) have icons associated with them, the icons corresponding to a meaning of the objects.

7. A method for visualization of context-based search results comprising:
   a) displaying a plurality of neurons that form a neural network, the neurons being associated with words, objects, sentences and documents, the neurons representing words corresponding to a search query ("word-neurons"), the neurons representing objects corresponding to concepts ("object-neurons"), the neurons representing sentences corresponding to sentences in the documents ("sentence-neurons") and the neurons representing documents corresponding to the search results ("document-neurons"),
   wherein relevance of the word-neurons is indicated by any of font size, text transparency, font color, and animation effects associated with text of at least some of the neurons, and
   wherein at least some of the neurons that correspond to objects (concepts) have icons associated with them, the icons corresponding to a meaning of the objects;
   b) based on user input, changing a position of one word-neuron; and
   c) in response to the change in position of one word-neuron, changing positions of other word-neurons on a display, thereby changing a context of the search query so as to identify contextually relevant documents.

8. The method of claim 7, wherein step (b) comprises pulling a relevant word-neuron upwards.

9. The method of claim 7, wherein step (b) comprises pushing an irrelevant neuron downwards.

10. The method of claim 7, wherein step (b) comprises changing a weight of a coefficient of a connection between two word-neurons.

11. The method of claim 7, wherein step (a) comprises displaying the word-neurons as being positioned on any of a circle, a sphere, a pyramid, a cube and a polyhedron.

12. A system for visualization of context-based search results comprising:
   a processor;
   a memory operatively coupled to the processor;
   computer code in the memory for implementing the following functionality:
   a) a plurality of neurons forming a neural network, the neurons being associated with words and documents, the neurons representing words corresponding to a search query ("word-neurons"), and the neurons representing documents corresponding to the search results ("document-neurons");
   b) a plurality of connections between the word-neurons and the document-neurons;
   c) a map that displays at least some of the word-neurons and the document-neurons to a user, wherein a manner of display and locations of the word-neurons on the map corresponds to their contextual relevance to a search query,
   wherein relevance of the word-neurons is indicated by any of font size, text transparency, font color, and animation effects associated with text of at least some of the neurons, and
   wherein at least some of the neurons that correspond to objects (concepts) have icons associated with them, the icons corresponding to a meaning of the objects;
   d) a display of hyperlinks to the relevant documents; and
   e) means for changing positions of the word-neurons relative to each other based on input from the user,
   f) wherein changing a position of one word-neuron relative to other word-neurons also changes positions of other contextually relevant word-neurons, thereby changing a context of the search query and displays different relevant documents.

13. The system of claim 12, wherein the map displays the word-neurons with their relevance identified by any of font type, color, transparency and font size.

14. The system of claim 12, wherein the map includes icons in proximity to the displayed word-neurons for identifying those word-neurons as irrelevant.

15. The system of claim 12, wherein the hyperlinks to the documents are obtained from a search engine having an input query.

16. The system of claim 12, wherein the map displays annotations for the documents next to the displayed documents.

17. The system of claim 12, wherein if a cursor is held over a word neuron on the map, the map displays other word-neurons that have connections to that word, and which were not previously displayed.

18. The system of claim 17, wherein, once the cursor is removed from the word neuron, the other word-neurons are no longer displayed.

19. The system of claim 17, wherein different search results are displayed based on a newly formed search query that includes the word-neuron, while the cursor is being held over the word-neuron.

20. The system of claim 17, wherein, once the cursor is removed from the word-neuron, the other word-neurons are no longer displayed, and previously displayed search results are again displayed.

21. A system for managing context of a search comprising:
a processor;
a memory operatively coupled to the processor;
computer code in the memory for implementing the following functionality:
a) a map that graphically displays search terms to a user in response to a search query, wherein the search terms are each associated with a word, and relative positions of the words corresponds to their connections in documents identified as relevant to the search query,
wherein relevance of the word-neurons is indicated by any of font size, text transparency, font color, and animation effects associated with text of at least some of the neurons, and
wherein at least some of the neurons that correspond to objects (concepts) have icons associated with them, the icons corresponding to a meaning of the objects; and
b) a display of search results corresponding to the search query;
c) wherein, bringing a cursor over one of the words temporarily displays other words, not previously shown, that are contextually connected to that word thereby changing a context of the search query and changes the display of the documents identified as most relevant, while the cursor is held over the selected word, and
d) wherein selecting the word permanently adds the selected word to the search query thereby changing a context of the search query and correspondingly changes the display of the documents identified as most relevant.

22. The system of claim 21, wherein the display of the search results includes a display of hyperlinks associated with the documents and a display of annotations associated with each document shown in proximity to the each document.

23. The system of claim 21, wherein the display of the search results includes a display of hyperlinks associated with the documents and a display of keywords associated with each document shown in proximity to the each document.

24. The system of claim 21, wherein the words displayed on the map at any given time to the user are associated with a corresponding word-neuron, such that connections between the word-neurons are reflected in the relative positions of the word-neurons on the map.

25. The system of claim 21, wherein a context of the displayed search results is saved for later retrieval.

26. A method for managing context of a search comprising:
a) graphically displaying on a map, to a user, search terms in response to a search query, wherein each search term is associated with a word, and relative positions of the words on the map corresponds to their connections in documents identified as relevant to the search query,
wherein relevance of the words is indicated by any of font size, text transparency, font color, and animation effects associated with text of at least some of the words, and
wherein at least some of the neurons that correspond to objects (concepts) have icons associated with them, the icons corresponding to a meaning of the objects; and
b) displaying search results corresponding to the search query;
c) wherein, bringing a cursor over one of the words temporarily displays other words, not previously shown, that are contextually connected to that word, thereby changing a context of the search query, and changes the display of the documents identified as most relevant, while the cursor is held over the selected word, and
d) wherein selecting the word permanently adds the selected word to the search query thereby changing a context of the search query and correspondingly changes the display of the documents identified as most relevant.

27. A method for managing context of a search comprising:
a) receiving a search query from a user;
b) generating search results based on the search query, the search results corresponding to identified documents;
c) associating a plurality of neurons that form a neural network with the documents and words in the documents, the neurons representing words corresponding to a search query ("word-neurons"), and the neurons representing documents corresponding to the search results ("document-neurons");
d) forming a plurality of connections between the word-neurons and the document-neurons;
e) displaying word-neurons corresponding to the search query on a map, wherein relative positions of the word-neurons, on the map, correspond to their connections in documents identified as relevant to the search query,
wherein relevance of the word-neurons is indicated by any of font size, text transparency, font color, and animation effects associated with text of at least some of the neurons, and
wherein at least some of the neurons that correspond to objects (concepts) have icons associated with them, the icons corresponding to a meaning of the objects;
f) changing a position of one word-neuron on the map relative to other word-neurons to thereby identify more relevant documents of the identified documents; and
g) displaying, to the user, the documents considered most relevant based on the search query and the relative positions of the displayed word-neurons on the map.

28. The method of claim 27, wherein bringing a cursor over one of the word-neurons on the map temporarily displays other words, not previously shown, that are contextually connected to that word-neuron, thereby changing a context of the search query and changes the display of the documents identified as most relevant, while the cursor is held over the selected word-neuron, and wherein selecting the word-neuron permanently adds the selected word-neuron to the search query, thereby changing a context of the search query, and correspondingly changes the display of the documents identified as most relevant.

29. A system for managing context of a search comprising:

a processor;

a memory operatively coupled to the processor;

computer code in the memory for implementing the following functionality:

a) means for receiving a search query from a user;

b) means for generating search results based on the search query, the search results corresponding to identified documents;

c) means for associating a plurality of neurons that form a neural network with the documents and words in the documents, the neurons representing words corresponding to the search query ("word-neurons"), and the neurons representing documents corresponding to the search results ("document-neurons");

d) means for forming a plurality of connections between the word-neurons and the document-neurons;

e) means for displaying the word-neurons corresponding to the search query on a map, wherein relative positions of the words, on the map, correspond to their connections in documents identified as relevant to the search query, wherein relevance of the word-neurons is indicated by any of font size, text transparency, font color, and animation effects associated with text of at least some of the neurons, and wherein at least some of the neurons that correspond to objects (concepts) have icons associated with them, the icons corresponding to a meaning of the objects;

f) means for changing a position of one word-neuron on the map relative to other word-neurons to thereby change a context of the search query and identify more relevant documents of the identified documents; and g) means for displaying, to the user, the documents considered most relevant based on the search query and based on the relative positions of the displayed word-neurons on the map.

30. A system for visualization of context-based search results comprising:

a processor;

a memory operatively coupled to the processor;

computer code in the memory for implementing the following functionality:

a) a plurality of neurons forming a neural network, the neurons being associated with documents, words in the documents and sentences in the documents, the neurons representing words corresponding to a search query ("word-neurons"), the neurons representing sentences corresponding to sentences in the documents ("sentence-neurons") and the neurons representing documents corresponding to the search results ("document-neurons"), wherein the documents are identified in response to a search query from a user;

b) a plurality of connections between the word-neurons and the document-neurons, wherein there are connections between some, but not all, word-neurons;

c) a map displaying the word-neurons to a user, documents identified as most relevant and annotations for the documents identified as most relevant, wherein relevance of the word-neurons is indicated by any of font size, text transparency, font color, and animation effects associated with text of at least some of the neurons; and d) means for changing positions of the word-neurons relative to each other based on input from the user, wherein changing a position of one word-neuron relative to other neurons also changes positions of other contextually relevant word-neurons, thereby changing a context of the search query and permitting the user to identify other documents that are more relevant to the user's search, and wherein at least some of the neurons that correspond to objects (concepts) have icons associated with them, the icons corresponding to a meaning of the objects.

* * * * *